(12) United States Patent
Wahadaniah et al.

(10) Patent No.: US 8,902,985 B2
(45) Date of Patent: Dec. 2, 2014

(54) IMAGE CODING METHOD AND IMAGE CODING APPARATUS FOR DETERMINING CODING CONDITIONS BASED ON SPATIAL-ACTIVITY VALUE

(75) Inventors: Viktor Wahadaniah, Singapore (SG); Chong Soon Lim, Singapore (SG); Han Boon Teo, Singapore (SG); Youji Shibahara, Osaka (JP); Takahiro Nishi, Nara (JP); Kiyofumi Abe, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 436 days.

(21) Appl. No.: 13/059,804

(22) PCT Filed: Jun. 16, 2010

(86) PCT No.: PCT/JP2010/003985
§ 371 (c)(1),
(2), (4) Date: Feb. 18, 2011

(87) PCT Pub. No.: WO2010/150486
PCT Pub. Date: Dec. 29, 2010

(65) Prior Publication Data
US 2011/0142134 A1    Jun. 16, 2011

(30) Foreign Application Priority Data

Jun. 22, 2009    (JP) .................................. 2009-148043

(51) Int. Cl.
*H04N 7/26*    (2006.01)
*H04N 19/61*    (2014.01)
(Continued)

(52) U.S. Cl.
CPC ............. *H04N 7/50* (2013.01); *H04N 7/26079* (2013.01); *H04N 7/26127* (2013.01);
(Continued)

(58) Field of Classification Search
CPC ....... H04N 7/12; H04N 7/50; H04N 7/26244; H04N 7/26095; H04N 7/26021; H04N 7/26053; H04N 7/26122; H04N 7/26127; H04N 7/26159

USPC ..................................................... 375/240.16
IPC ........................................................ H04N 7/12
See application file for complete search history.

(56) References Cited

U.S. PATENT DOCUMENTS 5,767,908 A     6/1998  Choi
(Continued)

FOREIGN PATENT DOCUMENTS

JP          5-91338          4/1993
(Continued)

OTHER PUBLICATIONS

International Search Report issued Aug. 31, 2010 in International (PCT) Application No. PCT/JP2010/003985.
(Continued)

*Primary Examiner* — Jay Patel
*Assistant Examiner* — Francis G Geroleo
(74) *Attorney, Agent, or Firm* — Wenderoth, Lind & Ponack, L.L.P.

(57) ABSTRACT

A method of coding an original image, including: partitioning (S110) the original image into blocks; determining (S120) a coding condition for a current one of the blocks; and coding (S130) the current block according to the determined coding condition, wherein the determining (S120) of the coding condition for the current block includes calculating (S210) a first spatial-activity value indicating complexity of at least a part of regions of the current block; comparing (S220) the first spatial-activity value with a first predetermined threshold value; determining (S230), as the coding condition for the current block, a first coding condition for small partitioning size, when the first spatial-activity value is smaller than the first predetermined threshold value; and determining (S240), as the coding condition for the current block, a second coding condition for large partitioning size, when the first spatial-activity value is equal to or larger than the first predetermined threshold value.

10 Claims, 23 Drawing Sheets

(51) Int. Cl.
*H04N 19/124* (2014.01)
*H04N 19/136* (2014.01)
*H04N 19/176* (2014.01)

(52) U.S. Cl.
CPC .............................. *H04N 7/26244* (2013.01)
USPC ................................................. 375/240.16

(56) References Cited

U.S. PATENT DOCUMENTS

| | | | |
|---|---|---|---|
| 2004/0125204 A1 | 7/2004 | Yamada et al. | |
| 2006/0002474 A1* | 1/2006 | Au et al. ................... | 375/240.16 |
| 2006/0165163 A1* | 7/2006 | Burazerovic et al. .... | 375/240.03 |
| 2006/0204115 A1 | 9/2006 | Burazerovic | |
| 2007/0047652 A1* | 3/2007 | Maruyama et al. ...... | 375/240.16 |
| 2007/0171974 A1* | 7/2007 | Baik ........................ | 375/240.12 |
| 2009/0097571 A1 | 4/2009 | Yamada et al. | |

FOREIGN PATENT DOCUMENTS

| | | |
|---|---|---|
| JP | 07-284105 | 10/1995 |
| JP | 08-280019 | 10/1996 |
| JP | 2003-204550 | 7/2003 |
| JP | 2006-519564 | 8/2006 |
| JP | 2006-519565 | 8/2006 |
| JP | 2007-60164 | 3/2007 |
| JP | 2007-110568 | 4/2007 |
| JP | 2008-004983 | 1/2008 |

OTHER PUBLICATIONS

"*Advanced video coding for generic audiovisual services*", Recommendation ITU-T H.264, Geneva, 2009.

* cited by examiner

IMAGE CODING METHOD AND IMAGE CODING APPARATUS FOR DETERMINING CODING CONDITIONS BASED ON SPATIAL-ACTIVITY VALUE

TECHNICAL FIELD

The present invention relates to image coding methods and image coding apparatuses, and in particular to image coding methods and image coding apparatuses for determining a coding condition for each block and coding a current block according to the determined coding condition.

BACKGROUND ART

In general, most image/video coding algorithms, such as the ISO/IEC 14496-2 Part 10 International Standard, utilize a block partitioning method. In a block partitioning method, an uncompressed original picture is partitioned into a number of M×N units of coding. Here, M denotes the number of samples in width and N denotes the number of samples in height. Examples of M and N values are 16 and 16, respectively.

Resulting units of coding are coded sequentially one after another. In most video coding algorithms, such as the ISO/IEC 14496-2 Part 10 International Standard, a unit of coding is usually referred to as a "macroblock". For clarity of description, the term "macroblock" may be used hereinafter to refer to the M×N unit of coding in an image/video coding algorithm.

Each macroblock is further partitioned into a number of K×L sub-macroblocks. Here, K denotes the number of samples in width and L denotes the number of samples in height. Examples of K and L values are 8 and 8, respectively. Coding processes are performed on the resulting sub-macroblocks sequentially one after another and, in some cases, independently of each other. Examples of sub-macroblock partitioning for sub-macroblock coding processes are transformation block sizes, intra prediction block sizes, and motion compensation block sizes. During the coding of a macroblock, different sub-macroblock partitioning may be used for different sub-macroblock coding processes.

Most video coding algorithms provide the flexibility of switching between several sub-macroblock coding tools. For example, the High Profile of the ISO/IEC 14496-2 Part 10 International Standard allows macroblock-level switching between 4×4 and 8×8 transformation block sizes (see Patent Literature (PTL) 1).

CITATION LIST

Patent Literature

[PTL 1]
Japanese Unexamined Laid-open Patent Application Publication No. 2007-110568

Non Patent Literature

[NPL 1]
ISO/IEC14496-2 Part 10

SUMMARY OF INVENTION

Technical Problem

However, the aforementioned conventional techniques entail a problem that it is impossible to sufficiently suppress both increase in calculation amount and degradation in image quality.

For example, to select the most appropriate sub-macroblock coding tools, one prior art uses an exhaustive selection processes in which all possible sub-macroblock coding processes are performed and coding costs are calculated. The sub-macroblock coding tool with the lowest coding cost is then selected and used as the best sub-macroblock coding tool. In the aforementioned conventional techniques, coding cost consists of a rate component (that is, the amount of bits required to store coding information) and a distortion component (that is, the amount of difference between the reconstructed samples and the original uncompressed samples).

However, the problem with this method is that generation of coding artifacts such as ringing artifacts and blocking artifacts is usually not reflected on the coding cost. Therefore, the selected sub-macroblock coding tool may not produce the highest possible image quality.

Ringing artifacts and blocking artifacts are noticeable artifacts in compressed images/videos. These artifacts are particularly noticeable in image/video coding algorithm such as the ISO/IEC 14496-2 Part 10 International Standard for achieving high compression rates.

In order to enhance the picture quality of a compressed video, these artifacts need to be reduced either before or during the encoding, or after the decoding of the video. Selecting visually best sub-macroblock coding tool is useful to reduce such artifacts in coding the video.

However, the problem with the conventional techniques for selecting the sub-macroblock coding tools to be performed using exhaustive selection processes based on the coding cost obtained according to the relationship between a coding rate and distortion, is that coding cost neither considers nor anticipates the effect of coding on the human visual system. Therefore, the determined sub-macroblock coding tool does not reduce ringing artifacts and blocking artifacts efficiently. In addition, exhaustive selection processes of the conventional techniques require the encoder to perform a large amount of calculation.

In view of this, the present invention aims to provide image coding methods and image coding apparatuses which allow suppression of degradation in image quality.

Solution to Problem

In order to solve the aforementioned problem, an image coding method according to an aspect of the present invention is an image coding method of coding an original image, the image coding method including: partitioning the original image into a plurality of blocks; determining a coding condition for a current block that is one of the blocks; and coding the current block according to the determined coding condition, wherein the determining of the coding condition for the current block includes determining the coding condition for the current block, based on a spatial-activity value that is a value indicating complexity of the current block, and the determining of the coding condition based on the spatial-activity value includes: calculating a first spatial-activity value indicating complexity of at least a part of regions of the current block; comparing the calculated first spatial-activity value with a first predetermined threshold value; determining, as the coding condition for the current block, a first coding condition indicating that the current block is coded in units of a sub-block having a first partitioning size, when the first spatial-activity value is smaller than the first predetermined threshold value; and determining, as the coding condition for the current block, a second coding condition indicating that the current block is coded in units of a sub-block having a second partitioning size larger than the first partitioning size, when the first spatial-activity value is equal to or larger than the first predetermined threshold value.

In this way, in the case where the current block partially includes a flat image, the coding condition (coding condition for small partitioning) is determined to code the current block in units of a sub-block having a small partitioning size. Therefore, it is possible to suppress ringing artifacts and blocking artifacts from occurring in the flat image. Accordingly, it is possible to suppress image quality degradation. Furthermore, in the case where the current block is a complex image, it is possible to increase the coding efficiency by determining the coding condition (coding condition for large partitioning) to code the current block in units of a sub-block having a large partitioning size without degrading the subjective image quality because distortion in the complex image is unlikely to be noticeable if any.

In addition, the calculating of the first spatial-activity value may include: forming a plurality of small-block clusters each including at least a part of regions of the current block, based on an extended block including at least the current block; and calculating a small-block cluster spatial-activity value that is a value indicating complexity of a corresponding one of the small-block clusters, and calculating, as the first spatial-activity value, a lowest value among the calculated small-block cluster spatial-activity values.

In this way, it is possible to calculate the spatial-activity value of each of the regions within the current block, compare the lowest spatial-activity value among the calculated spatial-activity values with a threshold value, and determine whether or not the most flat region among the regions within the current block in which distortion is likely to be noticeable. Since the coding condition for small partitioning is selected when the current block includes a region in which distortion is likely to be noticeable, it is possible to suppress image quality degradation.

In addition, the determining of the coding condition may further include: partitioning the current block into a plurality of large blocks; calculating a large-block spatial-activity value that is a value indicating complexity of a corresponding one of the large blocks, and calculating, as a second spatial-activity value, a highest value among the calculated large-block spatial-activity values; comparing the calculated second spatial-activity value with a second predetermined threshold value; determining the second coding condition as the coding condition for the current block when the second spatial-activity value is equal to or smaller than the second predetermined threshold value; and determining the coding condition for the current block by the calculating and comparing of the first spatial-activity value when the second spatial-activity value is larger than the second predetermined threshold value.

In this way, since the coding condition for large partitioning is determined when the current block is flat and has a small amount of information, it is possible to increase the coding efficiency.

In addition, the extended block may be larger than the current block.

In this way, since not only information about the current block but also information about images around the current block are used to determine whether or not the current block includes a flat region, it is possible to appropriately suppress degradation in image quality and increase the coding efficiency.

In addition, the value indicating the complexity of the current block may be a value indicating an amount of fluctuation in sample values of a plurality of samples included in the current block.

In this way, it is possible to easily calculate a spatial-activity value of a block according to the calculation method using such sample values.

In addition, the determining of the coding condition for the current block may further include determining the coding condition for the current block based on a motion for the current block, and the determining of the coding condition based on the motion may include: calculating a motion vector for the current block; comparing an absolute value of the calculated motion vector with a third predetermined threshold value; determining the second coding condition as the coding condition for the current block when the absolute value of the motion vector is larger than the third predetermined threshold value; and determining the coding condition for the current block, according to a result of the determination of the coding condition based on the spatial-activity value, when the absolute value of the motion vector is equal to or smaller than the third predetermined threshold value.

In this way, it is possible to suppress subjective image quality degradation and increase the coding efficiency by determining the coding condition for large partitioning when a motion is large. This is achieved because, even when distortion propagates, the distortion is unlikely to be noticeable when the motion is large.

In addition, the determining of the coding condition based on the motion may further include: generating a prediction block for the current block by performing motion compensation using the calculated motion vector; calculating a cost value indicating a coding efficiency of the current block using the current block, the prediction block, and the motion vector; comparing the cost value with a fourth predetermined threshold value when the absolute value of the motion vector is equal to or smaller than the third predetermined threshold value; determining the second coding condition as the coding condition for the current block when the cost value is smaller than the fourth predetermined threshold value; and determining the coding condition for the current block, according to the result of the determination of the coding condition based on the spatial-activity value, when the cost value is equal to or larger than the fourth predetermined threshold value.

In this way, it is possible to increase the coding efficiency by determining the coding condition for large partitioning when a cost value is small.

In addition, the cost value may be calculated based on a sum of absolute differences between the current block and the prediction block.

In this way, it is possible to easily calculate a cost value according to the calculation method using such sample values.

In addition, the sub-block having either the first partitioning size or the second partitioning size may be a unit of processing based on which at least one of intra prediction, motion compensation, and frequency transformation is executed.

Furthermore, an image coding method according to an aspect of the present invention is an image coding method of coding an original image, the image coding method including: partitioning the original image into a plurality of blocks; determining a coding condition for a current block that is one of the blocks; and coding the current block according to the determined coding condition, wherein the determining of the coding condition for the current block includes: calculating a motion vector for the current block; comparing an absolute value of the calculated motion vector with a predetermined threshold value; determining, as the coding condition for the current block, a first coding condition indicating that the current block is coded in units of a sub-block having a first partitioning size, when the absolute value of the motion vector is equal to or smaller than the predetermined threshold value; and determining, as the coding condition for the current block, a second coding condition indicating that the current block is coded in units of a sub-block having a second partitioning size larger than the first partitioning size, when the absolute value of the motion vector is larger than the predetermined threshold value.

In this way, it is possible to suppress subjective image quality degradation and increase the coding efficiency by determining the coding condition for large partitioning when a motion is large. This is achieved because, even when distortion propagates, the distortion is unlikely to be noticeable when the motion is large. In addition, since distortion is likely to be noticeable when a motion is small, it is possible to suppress image quality degradation by determining the coding condition for small partitioning.

It is to be noted that the present invention can be implemented not only as an image coding method, but also as an image coding apparatus including processing units for executing the processes of the image coding method. In addition, the present invention may be implemented as a program causing a computer to execute the processes of the image coding method. Furthermore, the present invention may be implemented as recording media such as a computer-readable CD-ROM (Compact Disc-Read Only Memory) on which the program is recorded, and as information, data, or signal indicating the program. Furthermore, these program, information data, and signal may be distributed through communication networks such as the Internet.

In addition, some or all of the structural elements that constitute the image coding apparatus may be formed with a single system LSI (Large Scale Integration). The system LSI is a super multi-functional LSI manufactured by integrating plural structural units on a single chip. Such system LSI is specifically a computer system configured to include a micro processor, a ROM, a RAM (Random Access Memory), and the like.

Advantageous Effects of Invention

According to the present invention, it is possible to sufficiently suppress both increase in calculation amount and degradation in image quality.

BRIEF DESCRIPTION OF DRAWINGS

FIG. 1 is a block diagram showing an exemplary structure of an image coding apparatus according to Embodiment 1 of the present invention.

FIG. 2 is a block diagram showing an exemplary structure of a coding condition determination unit according to Embodiment 1 of the present invention.

FIG. 3 is a schematic diagram for illustrating an effect of ringing artifact reduction by the image coding apparatus according to Embodiment 1 of the present invention.

FIG. 4 is a schematic diagram for illustrating a possible position of a coding tool indicator signal in a compressed video bitstream according to Embodiment 1 of the present invention.

FIG. 5 is a flowchart indicating exemplary operations performed by the image coding apparatus according to Embodiment 1 of the present invention.

FIG. 6 is a flowchart indicating exemplary operations performed by the coding condition determination unit according to Embodiment 1 of the present invention.

FIG. 7 is a block diagram showing an exemplary structure of an image coding apparatus according to Embodiment 2 of the present invention.

FIG. 8 is a schematic diagram of an exemplary formation of a picture sample according to Embodiment 2 of the present invention.

FIG. 9 is a block diagram showing an exemplary structure of a spatial-activity condition evaluation unit an image coding apparatus according to Embodiment 2 of the present invention.

FIG. 10 is a block diagram showing an exemplary structure of a motion-activity condition evaluation unit in the image coding apparatus according to Embodiment 2 of the present invention.

FIG. 11 is a flowchart indicating exemplary operations performed by the image coding apparatus according to Embodiment 2 of the present invention.

FIG. 12 is a flowchart indicating exemplary operations performed by a spatial-activity condition evaluation unit according to Embodiment 2 of the present invention.

FIG. 13 is a flowchart indicating a detailed example of operations performed by the spatial-activity condition evaluation unit according to Embodiment 2 of the present invention.

FIG. 14 is a flowchart indicating exemplary operations performed by the motion-activity condition evaluation unit according to Embodiment 2 of the present invention.

FIG. 15 is a flowchart indicating exemplary operations performed by the coding condition determination unit according to a variation of an embodiment of the present invention.

FIG. 17 shows an external view of a cellular phone.

FIG. 18 is a block diagram showing an example of a configuration of the cellular phone.

FIG. 20 is a block diagram showing an example of a configuration of a television set.

FIG. 21 is a block diagram showing an example of a configuration of an information reproducing and recording unit that reads and writes information from and on a recording medium that is an optical disc.

FIG. 22 shows an example of a configuration of a recording medium that is an optical disc.

FIG. 23 is a block diagram showing an example of a configuration of an integrated circuit for implementing the image coding method and the image decoding method according to each of Embodiments.

DESCRIPTION OF EMBODIMENTS

Embodiments of image coding methods and image coding apparatuses according to the present invention will be described below in detail with reference to the drawings.

[Embodiment 1]

An image coding method according to Embodiment 1 of the present invention is intended to code an original image. The image coding method involves partitioning the original image into plural blocks, determining a coding condition for a current one of the blocks, and coding the current block according to the determined coding condition. In the determination of the coding condition for the current block, the coding condition is determined based on a spatial-activity value that is a value indicating complexity of the current block.

More specifically, the method involves calculating a first spatial-activity value that is a value indicating the complexity of at least a part of the regions of the current block, and comparing the first spatial-activity value with a first predetermined threshold value. Furthermore, in the case where the first spatial-activity value is smaller than the first threshold value, the method involves determining, as the coding condition for the current block, a first coding condition indicating that the current block is coded in units of a sub-block having a first partitioning size. In the case where the first spatial-activity value is equal to or larger than the first threshold value, the method involves determining, as the coding condition for the current block, a second coding condition indicating that the current block is coded in units of a sub-block having a second partitioning size larger than the first partitioning size.

First, the following describes an image coding apparatus which executes the image coding method according to Embodiment 1 of the present invention.

Figure 1:
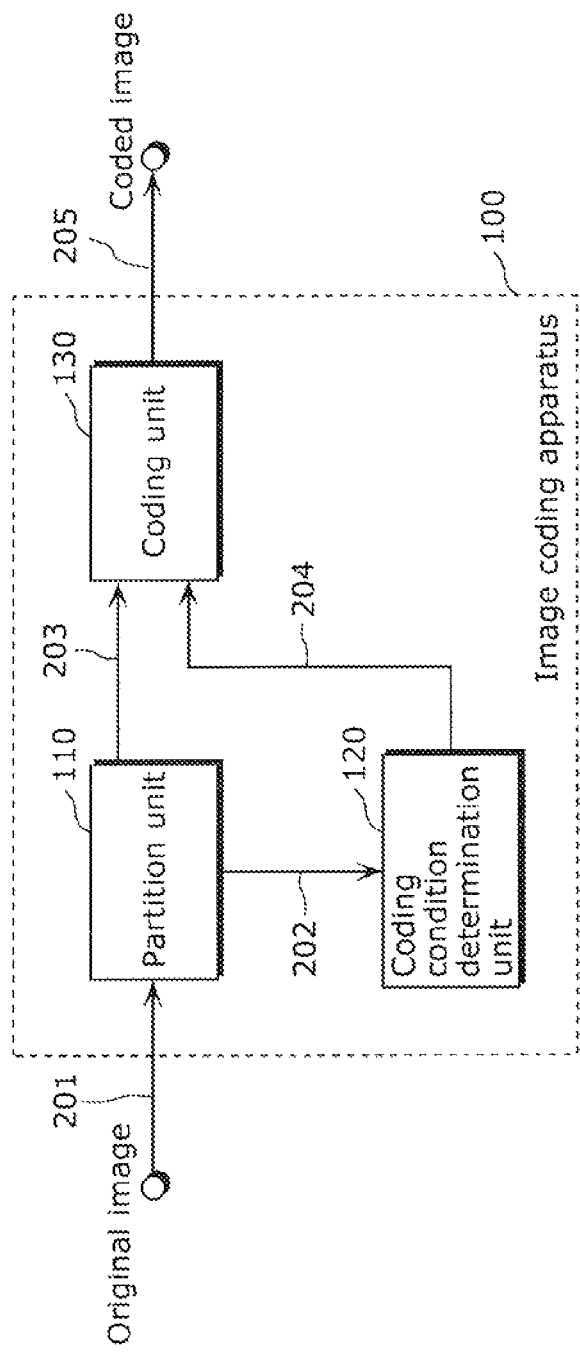
[FIG. 1]

FIG. 1 is a block diagram showing an exemplary structure of an image coding apparatus 100 according to Embodiment 1 of the present invention. The image coding apparatus 100 generates a coded image 205 by coding an uncompressed original image 201.

As shown in FIG. 1, the image coding apparatus 100 includes a partition unit 110, a coding condition determination unit 120, and a coding unit 130. The image coding apparatus 100 codes the original image 201 in units of a block.

The partition unit 110 partitions the input original image 201 into plural blocks. For example, the original image 201 is a single picture included in a moving image or a single still image. The plural blocks are, for example, plural macroblocks. As a specific example, a macroblock includes 16×16 luminance value samples, and includes, for each color component, 8×8 chrominance value samples.

The current block 203 that is one of the partition blocks is output to the coding unit 130. In addition, an extended block 202 that includes at least the current block 203 is output to the coding condition determination unit 120.

The extended block 202 may be the same in size as the current block 203, that is, the extended block 202 may be the current block 203. As will be described later, it is preferable that the extended block 202 includes the current block 203, and thus is a block having a size larger than the size of the current block 203.

For example, the extended block 202 is an extended macroblock including at least the current macroblock, and includes 24×24 luminance value samples, and includes, for each color component, 12×12 chrominance value samples.

The coding condition determination unit 120 determines a coding condition 204 for the current block that is one of the plural blocks. In other words, the coding condition determination unit 120 determines the coding condition (coding tool) for each block. The detailed structure of the coding condition determination unit 120 will be described later with reference to FIG. 2.

The coding unit 130 codes the current block 203 according to the coding condition 204 determined by the coding condition determination unit 120. More specifically, the coding unit 130 generates a coded image 205 by coding current blocks 203 that are sequentially input from the partition unit 110.

Figure 2:
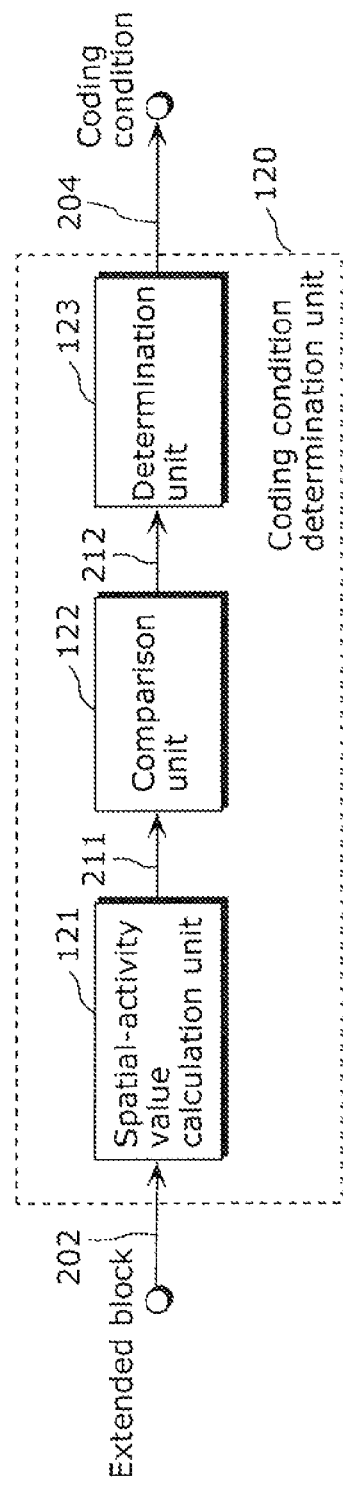
[FIG. 2]

FIG. 2 is a block diagram showing an exemplary structure of a coding condition determination unit 120 according to Embodiment 1 of the present invention. The coding condition determination unit 120 determines the coding condition for the current block 203, based on the spatial-activity value that is a value indicating the complexity of the current block 203.

The spatial-activity value that is the value indicating the complexity of the current block 203 is a value indicating the amount of fluctuation in sample values of the current block 203. In other words, the spatial-activity value is a value indicating the complexity of a block that is a group of sample values, and is a value indicating the amount of fluctuation in the sample values in the block.

For example, a spatial-activity value is a variance of plural sample values. A spatial-activity value may be a sum of absolute differences between the average value of the plural sample values and each of the sample values, or a sum of absolute differences between adjacent samples.

When a block has a small spatial-activity value, the block is a flat image, for example, an image having luminance values within a certain range (computer graphics image). In contrast, when a block has a large spatial-activity value, the block is a complex image, for example, a natural image captured by a camera.

As shown in FIG. 2, the coding condition determination unit 120 includes a spatial-activity value calculation unit 121, a comparison unit 122, and a determination unit 123.

The spatial-activity value calculation unit 121 calculates a first spatial-activity value 211 that is a value indicating complexity of at least a part of regions of the current block 203. For example, the spatial-activity value calculation unit 121 forms plural small-block clusters, based on the extended block 202 including the current block 203. Each of the plural small-block clusters includes a part of the regions of the current block 203.

The spatial-activity value calculation unit 121 calculates a small-block cluster spatial-activity value indicating the complexity of each of the plural small-block clusters. Next, the spatial-activity value calculation unit 121 calculates, as a first spatial-activity value 211, the lowest value among the calculated small-block cluster spatial-activity values.

The comparison unit 122 compares the first spatial-activity value 211 calculated by the spatial-activity value calculation unit 121 with the first predetermined threshold value. Next, the comparison unit 122 outputs, to the determination unit 123, a comparison result 212 indicating the lowest one of the first spatial-activity value 211 and the first threshold value.

The determination unit 123 determines the coding condition for the current block 203, based on the comparison result 212. More specifically, in the case where the first spatial-activity value 211 is smaller than the first threshold value, the determination unit 123 determines, as the coding condition for the current block 203, a first coding condition indicating that the current block 203 is coded in units of a sub-block having the first partitioning size.

A sub-block in the first coding condition is a unit of processing that is subjected to at least one of intra prediction, motion compensation, and frequency transformation. For example, the sub-block in the first coding condition consists of either 4×4 sample values or 8×8 sample values. In the case where the first coding condition is determined as the coding condition for the current block, the coding unit 130 partitions the current block into sub-blocks each having the partitioning size indicated as the first coding condition, and codes the current block with intra prediction and the like in units of a partition sub-block.

In addition, in the case where the first spatial-activity value 211 is equal to or larger than the first threshold value, the determination unit 123 determines, as the coding condition for the current block 203, a second coding condition indicating that the current block 203 is coded in units of a sub-block having the second partitioning size larger than the first partitioning size. A sub-block in the second coding condition is a unit of processing that is subjected to at least one of the intra prediction, motion compensation, and frequency transformation. For example, the sub-block in the second coding condition consists of 16×16 sample values. In the case where the second coding condition is determined as the coding condition for the current block, the coding unit 130 partitions the current block into sub-blocks each having the partitioning size indicated as the second coding condition, and codes the current block with intra prediction in units of a partition sub-block. The size of the sub-block in the second coding condition may be the same as the size of the current block.

As shown in the above-described structure, in the case where the first spatial-activity value is smaller than the first threshold value, the image coding apparatus 100 according to Embodiment 1 of the present invention determines coding conditions for coding a current block in units of a sub-block having a small partitioning size. In the case where the first spatial-activity value is equal to or larger than the first threshold value, the image coding apparatus 100 determines coding conditions for coding a current block in units of a sub-block having a large partitioning size.

In other words, the image coding apparatus 100 determines the coding conditions such that the current block is partitioned into sub-blocks having a small partitioning size in the case where a part of the current block is a flat image, and such that the current block is partitioned into sub-blocks having a large partitioning size in the case where the current block is a complex image. In this way, it is possible to suppress occurrence of ringing artifacts and blocking artifacts in a flat image.

Figure 3:
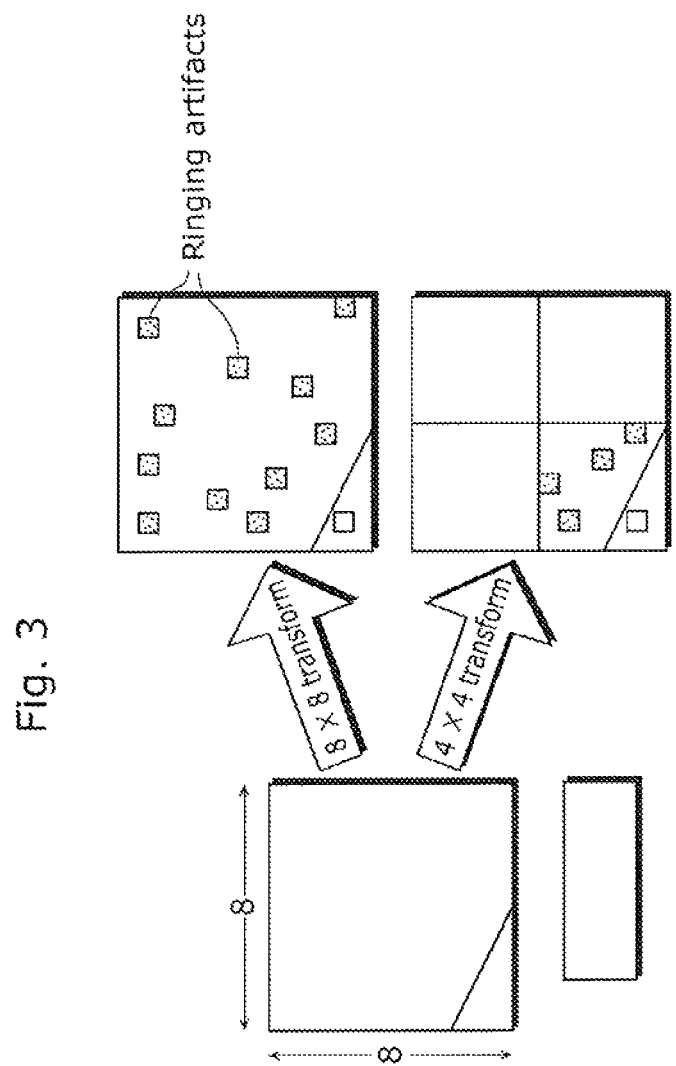
[FIG. 3]

FIG. 3 is a schematic diagram for illustrating an effect of ringing artifact reduction by the image coding apparatus 100 according to Embodiment 1 of the present invention.

As shown in FIG. 3(a), when performing coding using an 8×8 partitioning size in the case where the 8×8 block has distortion in the left corner, the distortion propagates throughout the block as shown in FIG. 3(b). In the case of coding an 8×8 block, coding using the 8×8 partitioning size increases the coding efficiency. Therefore, the 8×8 partitioning size has conventionally been selected. Accordingly, the conventional technique cannot suppress image quality degradation due to the distortion propagated throughout the block.

Meanwhile, in the case of performing coding using the 4×4 partitioning size, the range in which the distortion propagates is limited to the lower-left 4×4 block as shown in FIG. 3(c). Accordingly, compared with FIG. 3(b), it is possible to suppress image quality degradation.

The image coding apparatus 100 according to Embodiment 1 of the present invention selects the 4×4 partitioning size, in the case where the first spatial-activity value that is a value indicating the complexity of at least a part of the regions of the current block is smaller than the first threshold value. In other words, the image coding apparatus 100 selects the small partitioning size in the case where the current block partly includes a flat region. Accordingly, with the image coding apparatus 100 according to Embodiment 1 of the present invention, it is possible to suppress image quality degradation as shown in FIG. 3(c).

Figure 4:
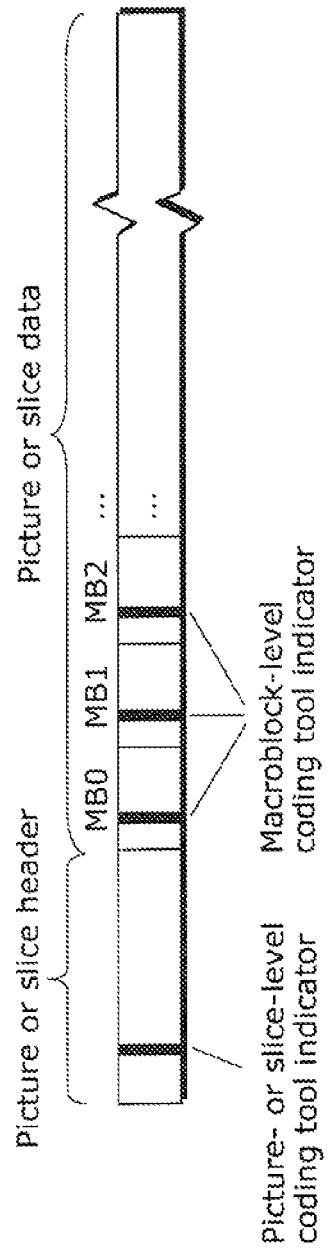
[FIG. 4]

The coding conditions determined by the coding condition determination unit 120 may be managed in units of either a picture, a slice, or a macroblock, as shown in FIG. 4. FIG. 4 is a diagram for illustrating a possible position of a coding tool indicator in a compressed image/video bitstream.

Coding tool selection may be indicated collectively for a group of macroblocks. Examples of such collective indicator in the case of the ISO/IEC 14496-2 Part 10 International Standard include the picture header and the slice header. On the other hand, coding tool selection may also be indicated exclusively for each macroblock, for example, at the macroblock header in the case of the ISO/IEC 14496-2 Part 10 International Standard.

Next, an image coding method executed by the image coding apparatus 100 according to Embodiment 1 of the present invention is described with reference to FIG. 5 and FIG. 6.

Figure 5:
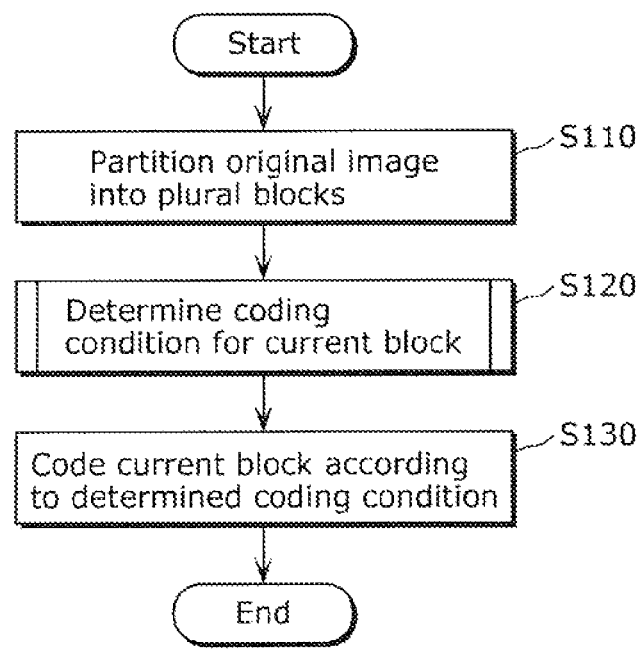
[FIG. 5]

FIG. 5 is a flowchart indicating exemplary operations performed by the image coding apparatus 100 according to Embodiment 1 of the present invention.

First, when an original image is input to the image coding apparatus 100, the partition unit 110 partitions the input original image into plural blocks (S110).

Next, the coding condition determination unit 120 determines the coding condition for a current block (S120). Detailed processes are described later with reference to FIG. 6.

Lastly, the coding unit 130 codes the current block according to the determined coding condition (S130).

It is to be noted that determinations on the coding condition for a current block (S120) and coding on the current block (S130) are repeated when a next block to be processed exists. In other words, the coding condition determination and coding are repeated on a new current block that has not yet been subjected to coding among the plural blocks generated by partitioning the original image.

Figure 6:
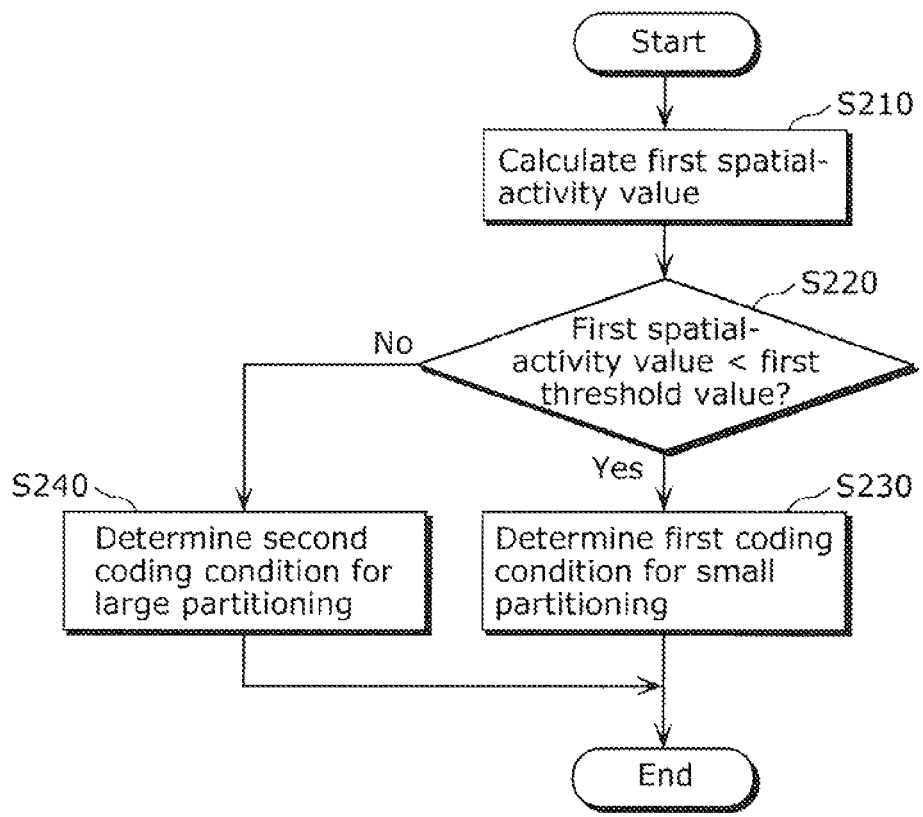
[FIG. 6]

FIG. 6 is a flowchart indicating exemplary operations performed by the coding condition determination unit 120 according to Embodiment 1 of the present invention.

First, the spatial-activity value calculation unit 121 calculates a first spatial-activity value that is a value indicating the complexity of at least a part of the regions of the current block (S210). More specifically, first, the spatial-activity value calculation unit 121 forms plural small-block clusters, based on an extended block including the current block. Next, the spatial-activity value calculation unit 121 calculates a small-block cluster spatial-activity value that is a spatial-activity value for each of the small-block clusters. The spatial-activity value calculation unit 121 calculates, as the first spatial-activity value, the lowest spatial-activity value in the calculated small-block cluster spatial-activity values.

Next, the comparison unit 122 compares the first spatial-activity value with the first threshold value (S220). More specifically, the comparison unit 122 determines whether or not the first spatial-activity value is smaller than the first threshold value.

When the first spatial-activity value is smaller than the first threshold value (Yes in S220), the determination unit 123 determines, as the coding condition for the current block, the first coding condition for small partitioning (S230). In other words, the determination unit 123 determines the first coding condition indicating that the current block is coded in units of a sub-block having the first partitioning size.

In addition, when the first spatial-activity value is equal to or larger than the first threshold value (No in S220), the determination unit 123 determines, as the coding condition for the current block, the second coding condition for large partitioning (S240). In other words, the determination unit 123 determines the second coding condition indicating that the current block is coded in units of a sub-block having the second partitioning size.

As described above, the image coding method according to Embodiment 1 of the present invention involves partitioning the current block into sub-blocks each having a small partitioning size in the case where a part of the current block is a flat image, whereas, in the case where the current block is a complex image, the image coding apparatus 100 determines the coding conditions for partitioning the current block into partition sub-blocks each having a large partitioning size. In this way, it is possible to suppress occurrence of ringing artifacts and blocking artifacts in a flat image. In this way, it is possible to increase the compression rate by determining the coding condition for large partitioning size when distortion is unlikely to be noticeable, and it is possible to suppress image quality degradation by determining the coding condition for small partitioning size when distortion is likely to be noticeable.

[Embodiment 2]

An image coding method according to Embodiment 2 of the present invention is characterized by not only evaluating a spatial-activity condition as shown in Embodiment 1, but also evaluating a motion-activity condition and determining the coding condition for a current block, based on the evaluation result. In addition, the evaluation of the spatial-activity condition involves evaluation of the spatial-activity for the plural large blocks included in the current block and evaluation of the spatial-activity for the plural small-block clusters included in an extended block including the current block.

The following describes an image coding apparatus which executes the image coding method according to Embodiment 2 of the present invention.

Figure 7:
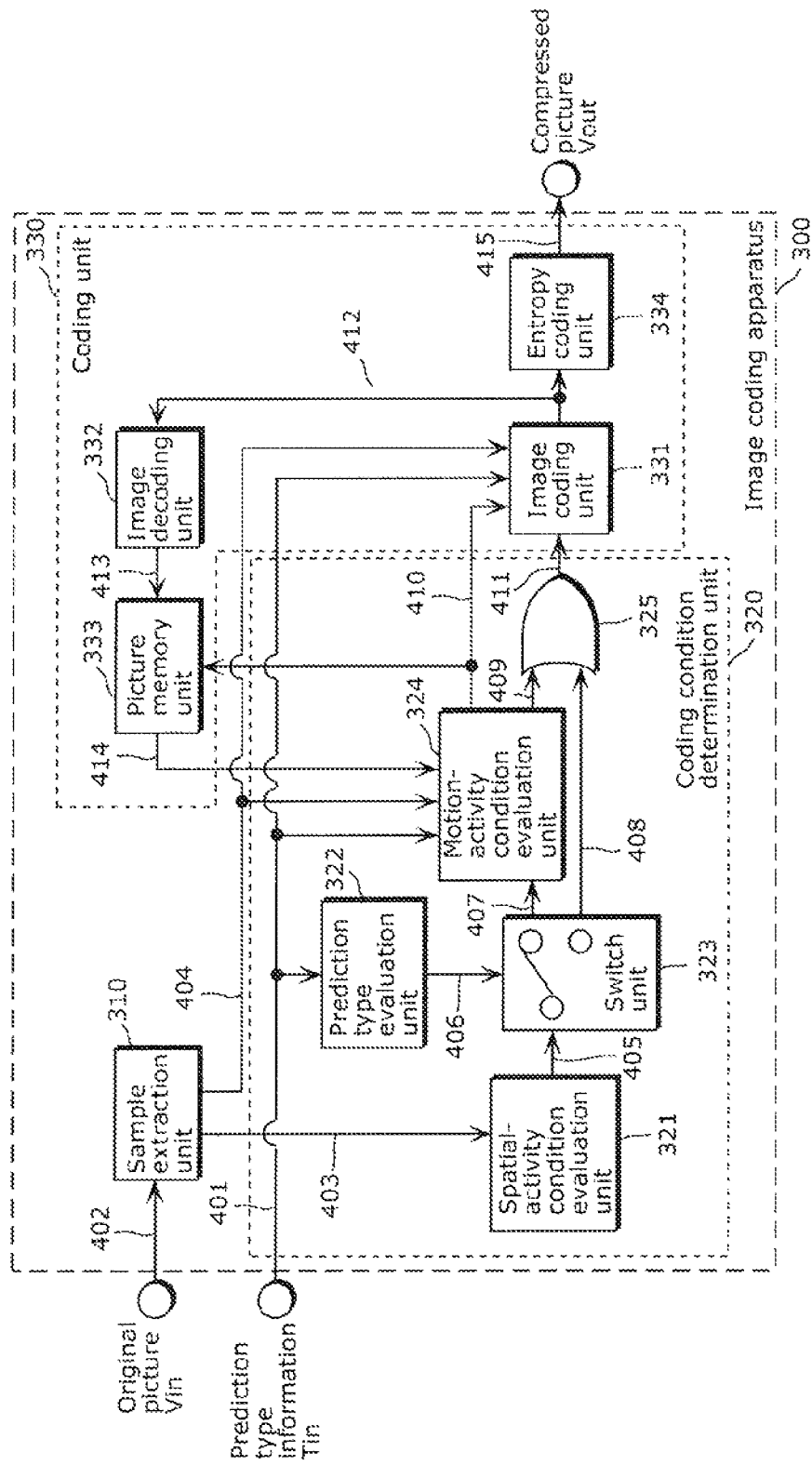
[FIG. 7]

FIG. 7 is a block diagram showing an exemplary structure of an image coding apparatus 300 according to Embodiment 2 of the present invention. The image coding apparatus 300 includes a sample extraction unit 310, a coding condition determination unit 320, and a coding unit 330.

The sample extraction unit 310 is an example of the partition unit according to the present invention, and partitions an original image into plural blocks. More specifically, the sample extraction unit 310 obtains, as an input image Vin, an original picture 402 that is a processing target, and partitions the obtained original picture 402 into plural blocks. Next, the sample extraction unit 310 outputs an M×N array of original samples 404 as a current block that is one of the plural blocks. Furthermore, the sample extraction unit 310 extracts and outputs an O×P array of original samples 403 as an extended block including the current block.

Figure 8:
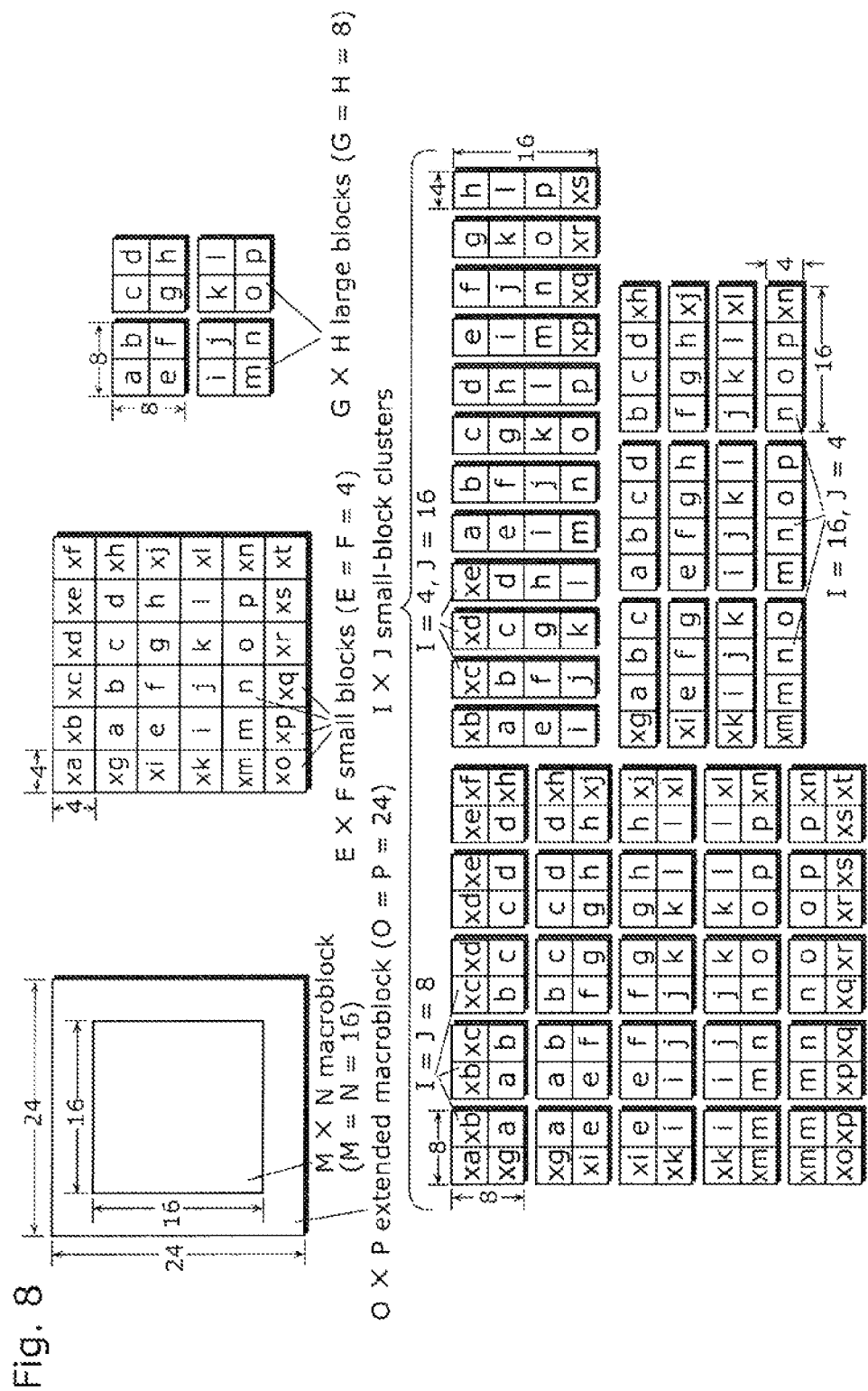
[FIG. 8]

Examples of O and P values are 24 and 24, respectively, and examples of M and N values are 16 and 16, respectively. The O×P array of original samples 403 encompasses the current macroblock and includes all M×N samples within the current macroblock, as shown in FIG. 8. In the case where O is equal to M and P is equal to N, the original samples 403 are the same as original samples 404. In other words, an extended macroblock may be the same as a current macroblock.

The coding condition determination unit 320 includes a spatial-activity condition evaluation unit 321, a prediction type evaluation unit 322, a switch unit 323, a motion-activity condition evaluation unit 324, and an OR gate unit 325.

The spatial-activity condition evaluation unit 321 determines the coding condition for the current block, based on the spatial-activity value that is a value indicating the complexity of the current block. More specifically, the spatial-activity condition evaluation unit 321 takes the O×P array of original samples 403, and evaluates the spatial-activity value of the input original samples. The spatial-activity condition evaluation unit 321 then outputs a coding tool determination signal 405 indicating either a "small-partitioning coding tool" or a "large-partitioning coding tool" which is to be used by the coding unit 330 to code a current macroblock.

The coding tool determination signal 405 is, for example, a binary value. Here, 0 represents a "small-partitioning coding tool", and 1 represents a "large-partitioning coding tool". The "small-partitioning coding tool" is an example of a coding tool according to the first coding condition, and for partitioning a current macroblock into sub-blocks each having the first partitioning size. Whereas, the "large partitioning coding tool" is an example of a coding tool according to the second coding condition, and a coding tool for partitioning a current macroblock into sub-blocks each having the second partitioning size.

Figure 9:
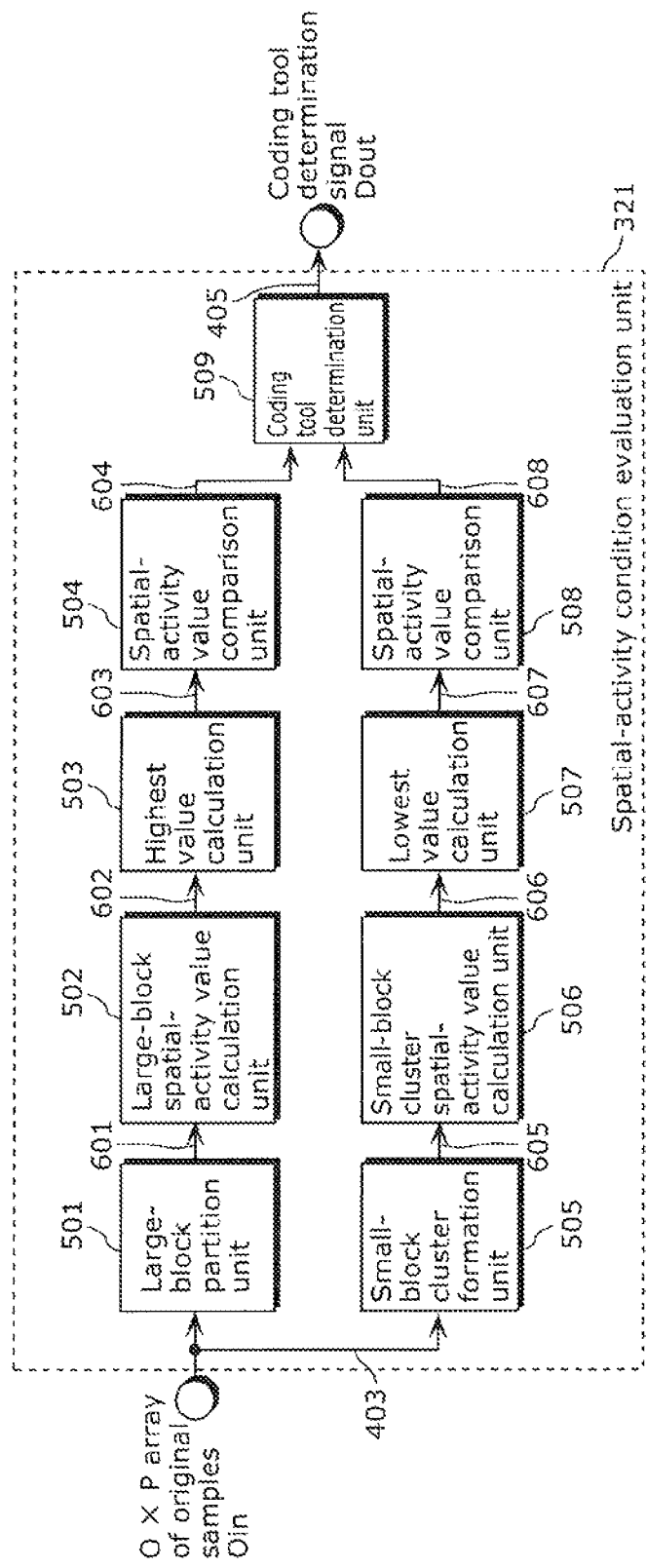
[FIG. 9]

The spatial-activity condition evaluation unit 321 is described in more detail with reference to FIG. 9. FIG. 9 is a block diagram showing an exemplary structure of a spatial-activity condition evaluation unit 321 according to Embodiment 2 of the present invention. As shown also in FIG. 7, the spatial-activity condition evaluation unit 321 receives inputs of the original samples 403 that correspond to an extended macroblock, and outputs a coding tool determination signal 405.

As shown in FIG. 9, the spatial-activity condition evaluation unit 321 includes, a large-block partition unit 501, a large-block spatial-activity value calculation unit 502, a highest value calculation unit 503, a spatial-activity value comparison unit 504, a small-block cluster formation unit 505, a small-block cluster spatial-activity value calculation unit 506, a lowest value calculation unit 507, a spatial-activity value comparison unit 508, and a coding tool determination unit 509.

The large-block partition unit 501 obtains, as an input sample Oin, an O×P array of original samples 403 extracted by the sample extraction unit 310. Next, the large-block partition unit 501 partitions an M×N partial array that is a part corresponding to the current macroblock into plural G×H large blocks, and outputs large block samples 601.

An example of large block samples 601 is shown in FIG. 8. In the example of FIG. 8, G and H denote 8 and 8, respectively, and a 16×16 current macroblock is partitioned into four 8×8 large block samples 601.

The large-block spatial-activity value calculation unit 502 receives the plural large block samples 601, and calculates the spatial-activity value for each of the received plural large block samples 601. The spatial-activity value calculated at this time is an example of a large-block spatial-activity value that is a value indicating the complexity of a large block according to the present invention.

Next, the large-block spatial-activity value calculation unit 502 outputs a set including all the large-block spatial-activity values 602 corresponding to the M×N array of original samples (a current macroblock). For example, in the example of FIG. 8, the large-block spatial-activity value calculation unit 502 calculates and outputs four large-block spatial-activity values 602.

The highest value calculation unit 503 determines the highest value among the values in the group of the plural large-block spatial-activity values 602, and outputs the determined highest value as the highest spatial-activity value 603. The highest spatial-activity value 603 is an example of the second spatial-activity value.

The spatial-activity value comparison unit 504 obtains a highest spatial-activity value 603, and compares it with a second predetermined threshold value for the spatial-activity value. Next, the spatial-activity value comparison unit 504 outputs a control signal 604 indicating the comparison result to the coding tool determination unit 509. In the case where the highest spatial-activity value 603 is larger than the second threshold value, a control signal 604 is set to 1. In the case where the highest spatial-activity value 603 is equal to or smaller than the second threshold value, a control signal 604 is set to 0.

The small-block cluster formation unit 505 obtains, as an input sample Oin, an O×P array of original samples 403 extracted by the sample extraction unit 310. Next, the small-block cluster formation unit 505 partitions this O×P array of original samples 403 into plural E×F small blocks, and classifies these small blocks into plural small-block clusters.

FIG. 8 shows examples of small-block cluster samples 605. In the example shown in FIG. 8, E and F denote 4 and 4, respectively, and a 24×24 extended macroblock is partitioned into thirty-six 4×4 small blocks.

Furthermore, the small-block cluster formation unit 505 forms I×J small-block clusters based on the thirty-six small blocks. Here, I and J denote mutually different sizes. Clusters formed in the example shown in FIG. 8 are twenty-five 8×8 small-block clusters, twelve 4×16 small-block clusters, and twelve 16×4 small-block clusters. The small-block cluster formation unit 505 outputs the formed small-block cluster samples 605 to the small-block cluster spatial-activity value calculation unit 506.

The small-block cluster spatial-activity value calculation unit 506 receives the small-block cluster samples 605, and calculates the spatial-activity values for the received respective small-block cluster samples 605. The spatial-activity values calculated at this time are examples of small-block cluster spatial-activity values that are values indicating the complexity of the small-block clusters according to the present invention.

Next, the small-block cluster spatial-activity value calculation unit 506 outputs a group which includes all the small-block cluster spatial-activity values 606 and corresponds to an O×P array of original samples (an extended macroblock). For example, in the example of FIG. 8, the small-block cluster spatial-activity value calculation unit 506 calculates and outputs, in total, forty-nine small-block cluster spatial-activity values 606.

The lowest value calculation unit 507 determines the lowest value in the group of the small-block cluster spatial-activity values 606, and outputs the determined lowest value as the lowest spatial-activity value 607. The lowest spatial-activity value 607 is an example of the first spatial-activity value.

The spatial-activity value comparison unit 508 obtains the lowest spatial-activity value 607, and compares it with a first predetermined threshold value for the spatial-activity value. Next, the spatial-activity value comparison unit 508 outputs a control signal 608 indicating the comparison result to the coding tool determination unit 509. In the case where the lowest spatial-activity value 607 is smaller than the first threshold value, a control signal 608 is set to 1. In the case where the lowest spatial-activity value 607 is equal to or larger than the first threshold value, a control signal 608 is set to 0.

The coding tool determination unit 509 obtains the control signals 604 and 608, and outputs the coding tool determination signal 405 indicating the determined one of the "small-partitioning coding tool" and the "large-partitioning coding tool". More specifically, when both the control signals 604 and 608 are 1 and 1, respectively, the coding tool determination unit 509 sets the coding tool determination signal 405 to indicate the "small-partitioning coding tool". Otherwise (when at least one of the control signals 604 and 608 is not 1), the coding tool determination unit 509 sets the coding tool determination signal 405 to indicate the "large-partitioning coding tool".

In the example of the aforementioned signal representation, it is possible to show the "small-partitioning coding tool" by setting, to 1, the value of the coding tool determination signal 405. In addition, it is possible to show the "large-partitioning coding tool" by setting, to 0, the value of the coding tool determination signal 405. The coding tool determination signal 405 is then transmitted as an output signal Dout.

Returning to FIG. 7, the prediction type evaluation unit 322 obtains an available prediction type information 401, and evaluates whether or not the inter prediction mode is available as a candidate prediction type for the current macroblock. Next, the prediction type evaluation unit 322 outputs the control signal 406 indicating the evaluation result to the switch unit 323.

When the inter prediction type is available, the control signal 406 is set to 1. When the inter prediction type is not available, the control signal 406 is set to 0. For example, the available prediction type information 401 is information indicating whether or not a current original picture 402 is a picture that should be coded as an I-picture. When the original picture 402 is a picture that should be coded as an I-picture, it is impossible to use the inter prediction type. Thus, the prediction type evaluation unit 322 sets the control signal 406 to 0.

In response to the control signal 406, the switch unit 323 determines one of the motion-activity condition evaluation unit 324 and the OR gate unit 325 as an output destination of the coding tool determination signal 405. More specifically, when the inter prediction type is available, the switch unit 323 outputs the coding tool determination signal to the motion-activity condition evaluation unit 324.

In other words, when the control signal 406 is 1, the switch unit 323 outputs the coding tool determination signal 405 as a coding tool determination signal 407, to the motion-activity condition evaluation unit 324. When the control signal 406 is 0, the switch unit 323 outputs the coding tool determination signal 405 as a coding tool determination signal 408, to the OR gate unit 325.

The motion-activity condition evaluation unit 324 determines the coding condition for the current block based on a motion for the current block. More specifically, the motion-activity condition evaluation unit 324 obtains, as inputs, the coding tool determination signal 407, the available prediction type information 401, the extracted M×N array of original samples 404, and the reconstructed picture 414. The motion-activity condition evaluation unit 324 evaluates the motion-activity condition, and outputs the coding tool determination signal 409 and the M×N array of inter prediction samples 410.

Figure 10:
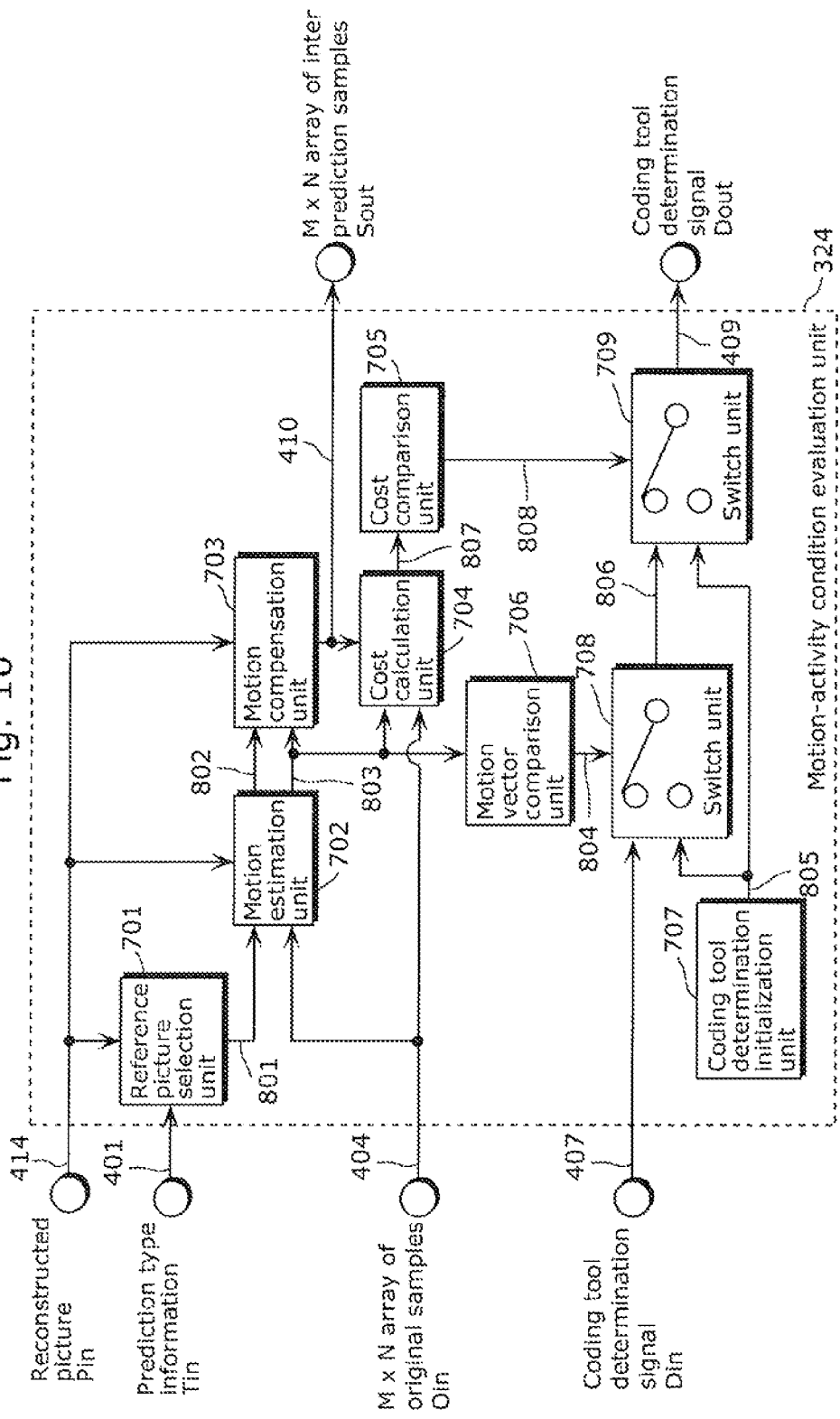
[FIG. 10]

The motion-activity condition evaluation unit 324 is described in more detail with reference to FIG. 10. FIG. 10 is a block diagram showing an exemplary structure of a motion-activity condition evaluation unit 324 according to Embodiment 2 of the present invention.

As shown in FIG. 10, the motion-activity condition evaluation unit 324 includes a reference picture selection unit 701, a motion estimation unit 702, a motion compensation unit 703, a cost calculation unit 704, a cost comparison unit 705, a motion vector comparison unit 706, a coding tool determination initialization unit 707, and two switch units 708 and 709.

The reference picture selection unit 701 receives, as inputs, a reconstructed picture 414 and available prediction type information 401, and outputs a set of one or more selected reference pictures 801 to be used in the motion estimation process.

The motion estimation unit 702 estimates a motion vector for the current block. More specifically, the motion estimation unit 702 obtains a group of reference pictures 801, performs motion estimation using these reference pictures 801, and outputs a group of reference picture indexes 802 and a group of motion vectors 803.

The motion vector comparison unit 706 obtains the group of motion vectors 803, and compares it with a third predetermined threshold value. Next, the motion vector comparison unit 706 outputs a control signal 804 indicating the comparison result.

When the absolute value of the motion vector is larger than the third threshold value, more specifically, when all of the absolute values of the respective components of the motion vector are larger than the predetermined threshold value for the motion vector, the motion vector comparison unit 706 sets the control signal 804 to 1. When the absolute value of the motion vector is equal to or smaller than the third threshold value, the motion vector comparison unit 706 sets the control signal 804 to 0.

The motion compensation unit 703 obtains the group of reference picture indexes 802, the group of motion vectors 803, and the group of reconstructed picture 414. The motion compensation unit 703 outputs the prediction image of the current macroblock, more specifically, the M×N array of inter prediction samples 410.

The cost calculation unit 704 obtains the M×N array of inter prediction samples 410, the M×N array of original samples 404, and the group of motion vectors 803. The cost calculation unit 704 outputs a cost value 807 to the cost comparison unit 705. An example of the cost value 807 is described later.

The cost comparison unit 705 obtains the cost value 807, and compares the obtained cost value 807 with a fourth predetermined threshold value. Next, the cost comparison unit 705 outputs a control signal 808 indicating the comparison result to the switch unit 709.

When the calculated cost value is smaller than the fourth threshold value, the cost comparison unit 705 sets the control signal 808 to 1. When the calculated cost value is equal to or larger than the fourth threshold value, the cost comparison unit 705 sets the control signal 808 to 0.

The coding tool determination initialization unit 707 generates an initialization signal 805 indicating a "large-partitioning coding tool". As described above, the signal indicating the "large-partitioning coding tool" is represented by 1 in the binary representation (for example, the coding tool determination signal 405 etc.). Thus, the initialization signal 805 can also be represented as 1 in the binary representation.

The switch unit 708 performs control as to which one of the coding tool determination signal 407 and the initialization signal 805 is output as the coding tool determination signal 806, according to the control signal 804. More specifically, in the case where the absolute value of a motion vector is larger than the third threshold value, that is, the control signal 804 is 1, the switch unit 708 outputs the initialization signal 805 as the coding tool determination signal 806. In other words, when the absolute value of the motion vector is larger than the third threshold value, the "large-partitioning coding tool" is selected as the coding tool indicated by the coding tool determination signal 806.

In the case where the absolute value of a motion vector is equal to or smaller than the third threshold value, that is, the control signal 804 is 0, the switch unit 708 outputs the coding tool determination signal 407 as the coding tool determination signal 806. In other words, when the absolute value is equal to or smaller than the third threshold value, the coding tool determined by the spatial-activity condition evaluation unit 321 as being the coding tool indicated by the coding tool determination signal 806.

The switch unit 709 performs control as to which one of the coding tool determination signal 806 and the initialization signal 805 is output as the coding tool determination signal 409, according to the control signal 808. More specifically, in the case where a cost value is smaller than the forth threshold value, that is, the control signal 808 is 1, the switch unit 709 outputs the initialization signal 805 as the coding tool determination signal 409. In other words, when the cost value is smaller than the fourth threshold value, the "large-partitioning coding tool" is selected as the coding tool indicated by the coding tool determination signal 409.

In the case where the cost value is equal to or larger than the fourth threshold value, that is, the control signal 808 is 0, the switch unit 709 outputs the coding tool determination signal 806 as the coding tool determination signal 409. The coding tool determination signal 806 is then transmitted as an output signal Dout.

Returning to FIG. 7, the OR gate unit 325 outputs the final coding tool determination signal 411 depending on whether or not the coding tool determination signals 408 and 409 are available. The final coding tool determination signal 411 includes finally determined coding tool information.

More specifically, in the case where at least one of the coding tool determination signals 408 and 409 is 1, the OR gate 325 outputs the final coding tool determination signal indicating 1. In other words, in the case where at least one of the spatial-activity condition evaluation unit 321 and the motion-activity condition evaluation unit 324 selects the "large-partitioning coding tool", the OR gate unit 325 sets the final coding tool determination signal 411 to 1 that is a value for indicating that the "large-partitioning coding tool" has been selected.

Meanwhile, in the case where both of the coding tool determination signals 408 and 409 are 0, the OR gate 325 outputs the final coding tool determination signal 411 indicating 0. In other words, in the case where both of the spatial-activity condition evaluation unit 321 and the motion-activity condition evaluation unit 324 select the "small-partitioning coding tool", the OR gate unit 325 sets the final coding tool determination signal 411 to 0 that is a value for indicating that the "small-partitioning coding tool" has been selected.

The coding unit 330 includes an image coding unit 331, an image decoding unit 332, a picture memory unit 333, and an entropy coding unit 334.

The image coding unit 331 uses, as inputs, the final coding tool determination signal 411, the available prediction type information 401, and the M×N array of original samples 404. In addition, in this embodiment, the image coding unit 331 takes the M×N array of inter predicted samples 410 as additional inputs to be used for the coding of the current M×N macroblock.

The image coding unit 331 then performs image coding process on the current macroblock using one of two predetermined, sets of coding tools selected by the final coding tool determination signal 411.

More specifically, the image coding unit 331 performs intra prediction, calculation of a difference from a prediction sample, frequency transformation, quantization, and the like, and thereby generating an M×N array of quantization residuals 412. Next, the image coding unit 331 outputs the M×N array of quantization residuals 412 both to the entropy coding unit 334 and the image decoding unit 332.

The entropy coding unit 334 performs entropy coding on the M×N array of quantization residuals 412 to generate a compressed bitstream 415. Next, the entropy coding unit 334 outputs the generated compressed bitstream 415 as an output signal Vout. The entropy coding unit 334 is not required to always perform entropy coding, and may perform another variable length coding.

The image decoding unit 332 decodes the quantization residuals 412 for reconstructing samples. In some examples in this embodiment, the image decoding unit 332 may take the M×N array of inter predicted samples 410 used to reconstruct the current M×N array of macroblock samples. The image decoding unit 332 finally outputs the M×N array of reconstructed samples 413 and stores the reconstructed samples 413 into the picture memory unit 333.

The picture memory unit 333 is a memory for storing the reconstructed samples 413 that is a locally decoded image. The reconstructed samples 413 stored in the picture memory unit 333 are referred to as a reference image by the motion-activity condition evaluation unit 324.

As described above, the image coding apparatus 300 according to Embodiment 2 of the present invention includes a spatial-activity condition evaluation unit 321 which evaluates a spatial-activity condition, and a motion-activity condition evaluation unit 324 which evaluates a motion-activity condition. Next, the image coding apparatus 300 determines the coding condition for a current block based on the evaluation result, and codes the current block according to the determined coding condition.

In this way, the coding condition is selected using the features of the image such as the spatial-activity condition and the motion-activity condition, which suppresses image quality degradation.

Figure 11:
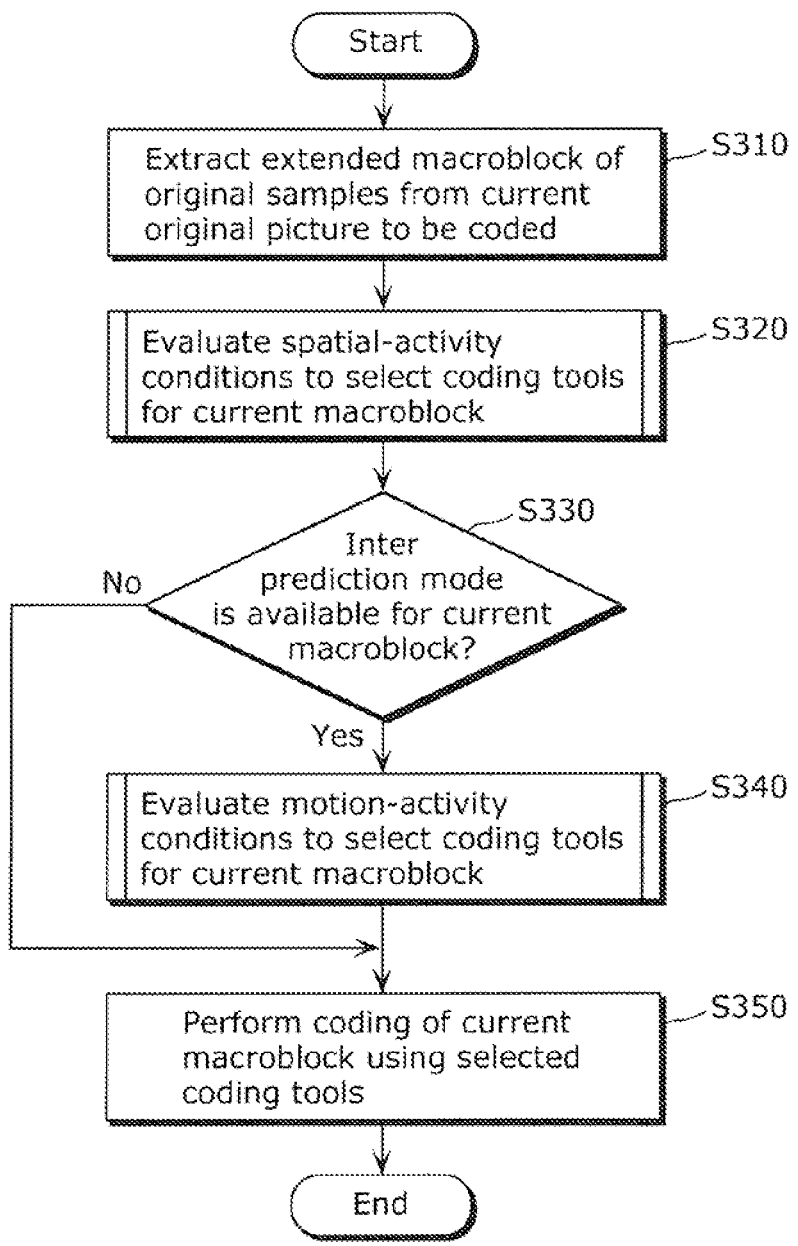
[FIG. 11]

Next, a description is given of exemplary operations performed by the image coding apparatus 300 according to Embodiment 2 of the present invention. FIG. 11 is a flowchart indicating exemplary operations performed by the image coding apparatus 300 according to Embodiment 2 of the present invention.

First, the sample extraction unit 310 extracts an O×P array of original samples from a current uncompressed original picture (S310). Here, O denotes the number of samples in width and is larger than or equal to M. Whereas, P denotes the number of samples in height and is larger than or equal to N. Examples of O and P values are 24 and 24, respectively. The O×P array of original samples 403 encompasses the current macroblock and includes all M×N samples of the current macroblock, as shown in FIG. 8.

For clarity of description, in the above and following descriptions, the term "extended-macroblock" will be used hereinafter to refer to the O×P array of original samples encompassing a current macroblock. Besides the O×P array of original samples (that is, an extended macroblock), the sample extraction unit 310 also outputs an M×N array of original samples which constitutes the current macroblock.

Figure 12:
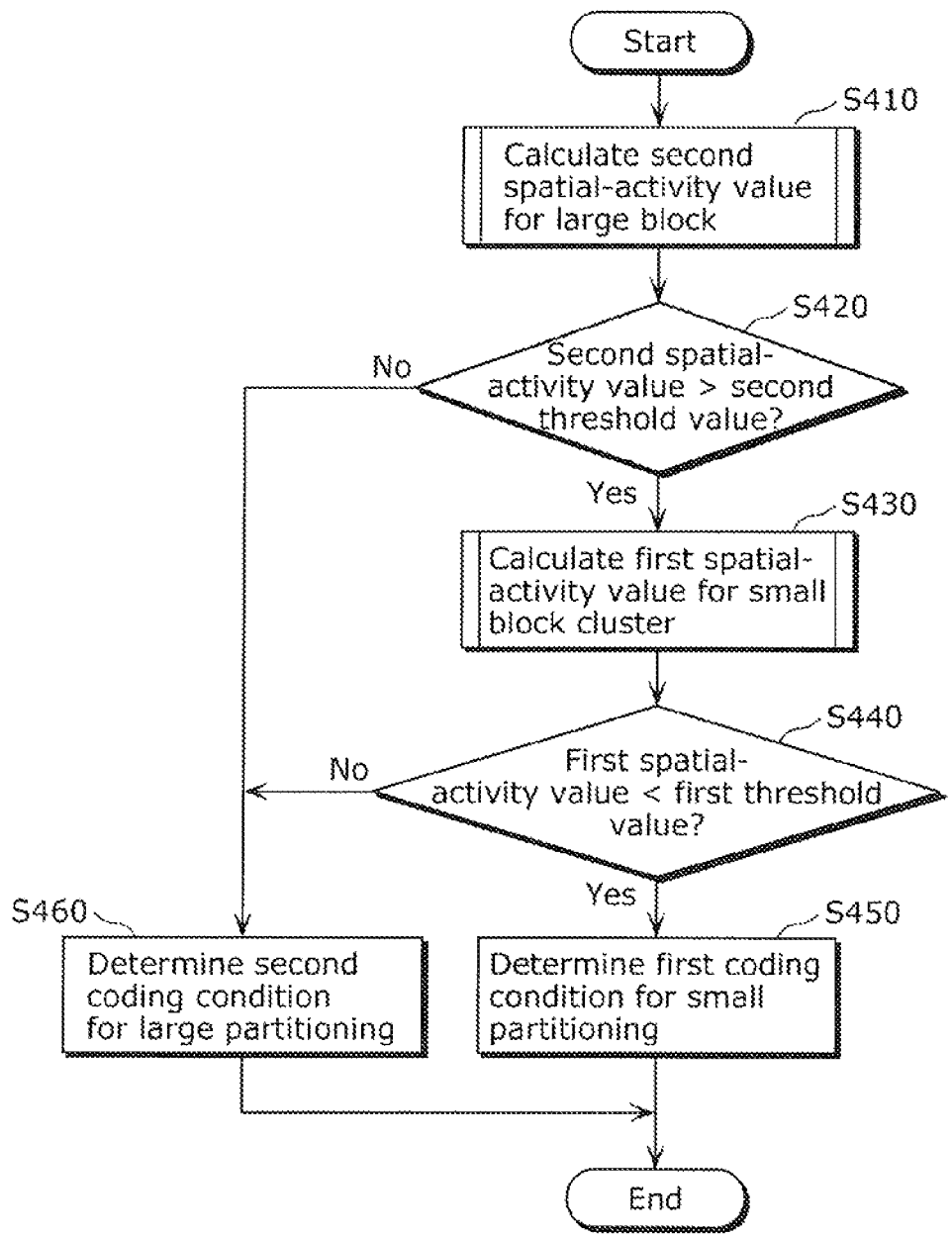
[FIG. 12]

Next, the spatial-activity condition evaluation unit 321 evaluates the spatial-activity conditions as a first set of conditions for selecting the most appropriate coding tools for coding the current macroblock (S320). The spatial-activity condition evaluation unit 321 is described in more detail with reference to FIG. 12. FIG. 12 is a flowchart indicating exemplary operations performed by the spatial-activity condition evaluation unit 321 according to Embodiment 2 of the present invention.

As shown in FIG. 12, the spatial-activity condition evaluation unit 321 performs processing on a large block basis, and thereby calculating a second spatial-activity value. As described above, the second spatial-activity value is the highest value among the spatial-activity values calculated in units of a large block. Detailed processes are described later with reference to FIG. 13.

Next, the spatial-activity value comparison unit 504 compares the second spatial-activity value with the second threshold value (S420). In the case where the second spatial-activity value is equal to or smaller than the second threshold value (No in S420), the coding tool determination unit 509 determines the second coding condition for large partitioning as the coding condition to be used for the current macroblock (S460).

To put these processes (S410, S420) differently, first, the spatial-activity condition evaluation unit 321 calculates the spatial-activity values for the current macroblock in units of a large block. In other words, the spatial-activity condition evaluation unit 321 calculates the complexity (or flatness) of the current macroblock in units of a large block.

Next, the spatial-activity condition evaluation unit 321 determines whether or not the highest one of the spatial-activity values for the respective large blocks is larger than a threshold value. In other words, the spatial-activity condition evaluation unit 321 determines whether or not the complexity of the most complex block from among the plural large blocks that constitute the current macroblock is larger than the threshold value. In the case where the complexity of the most complex block is equal to or smaller than the threshold value, the coding tools for large partitioning are selected.

When the complexity of the most complex block is equal to or smaller than the threshold value, the flatness of the current macroblock is high. In other words, this means that the information amount of the current macroblock is small. Thus, it is possible to save the coding amount by increasing the compression rate using the coding tools for large partitioning. Distortion in this image is unlikely to be noticeable due to the complexity, and therefore it is possible to suppress the subjective image quality degradation even in the case of using the coding tools for large partitioning.

In the case where the second spatial-activity value is larger than the second threshold value (Yes in S420), the spatial-activity condition evaluation unit 321 performs processing on a small-block cluster basis, and thereby calculating the first spatial-activity values (S430). As described above, the first spatial-activity value is the lowest value among the spatial-activity values calculated in units of a small block cluster. Detailed processes are described later with reference to FIG. 13.

Next, the spatial-activity value comparison unit 508 compares the first spatial-activity value with the first threshold value (S440). When the first spatial-activity value is smaller than the first threshold value (Yes in S440), the coding tool determination unit 509 determines, as the coding condition for the current macroblock, the first coding condition for small partitioning (S450).

To put these processes (S430, S440) differently, first, the spatial-activity condition evaluation unit 321 calculates the spatial-activity values for the current macroblock in units of a small-block cluster. In other words, the spatial-activity condition evaluation unit 321 calculates the complexity (or flatness) of the current macroblock in units of a small-block cluster.

Next, the spatial-activity condition evaluation unit 321 determines whether or not the lowest one of the spatial-activity values of the respective small-block clusters is smaller than a threshold value. In other words, the spatial-activity condition evaluation unit 321 determines whether or not the complexity of the most flat small-block cluster among the plural small-block clusters each including a part of the current macroblock is smaller than the threshold value. In the case where the complexity of the most flat small-block cluster is smaller than the threshold value, the coding tools for small partitioning are selected.

When the complexity of the most flat small-block cluster is smaller than the threshold value, the current macroblock partially includes a region having high flatness. In other words, the current macroblock includes a flat region in which the subjective image quality degradation is likely to be noticeable in the case where distortion propagates in the flat region.

Accordingly, in the case where the complexity of the most flat small-block cluster is smaller than the threshold value, it is possible to suppress distortion propagation by using the coding tools for small partitioning as shown in FIG. 3. Therefore, it is possible to suppress the subjective image quality degradation.

In the case where the first spatial-activity value is equal to or larger than the first threshold value (No in S440), the coding tool determination unit 509 determines the second coding condition for large partitioning as the coding condition to be used for the current macroblock (S460). When the first spatial-activity value is equal to or larger than the first threshold value, the current macroblock does not include any flat region having high flatness. Accordingly, even when distortion propagates within the current macroblock, the subjective image quality degradation is unlikely to be noticeable. For this reason, it is possible to reduce the coding amount by selecting the second coding condition for large partitioning.

Figure 13:
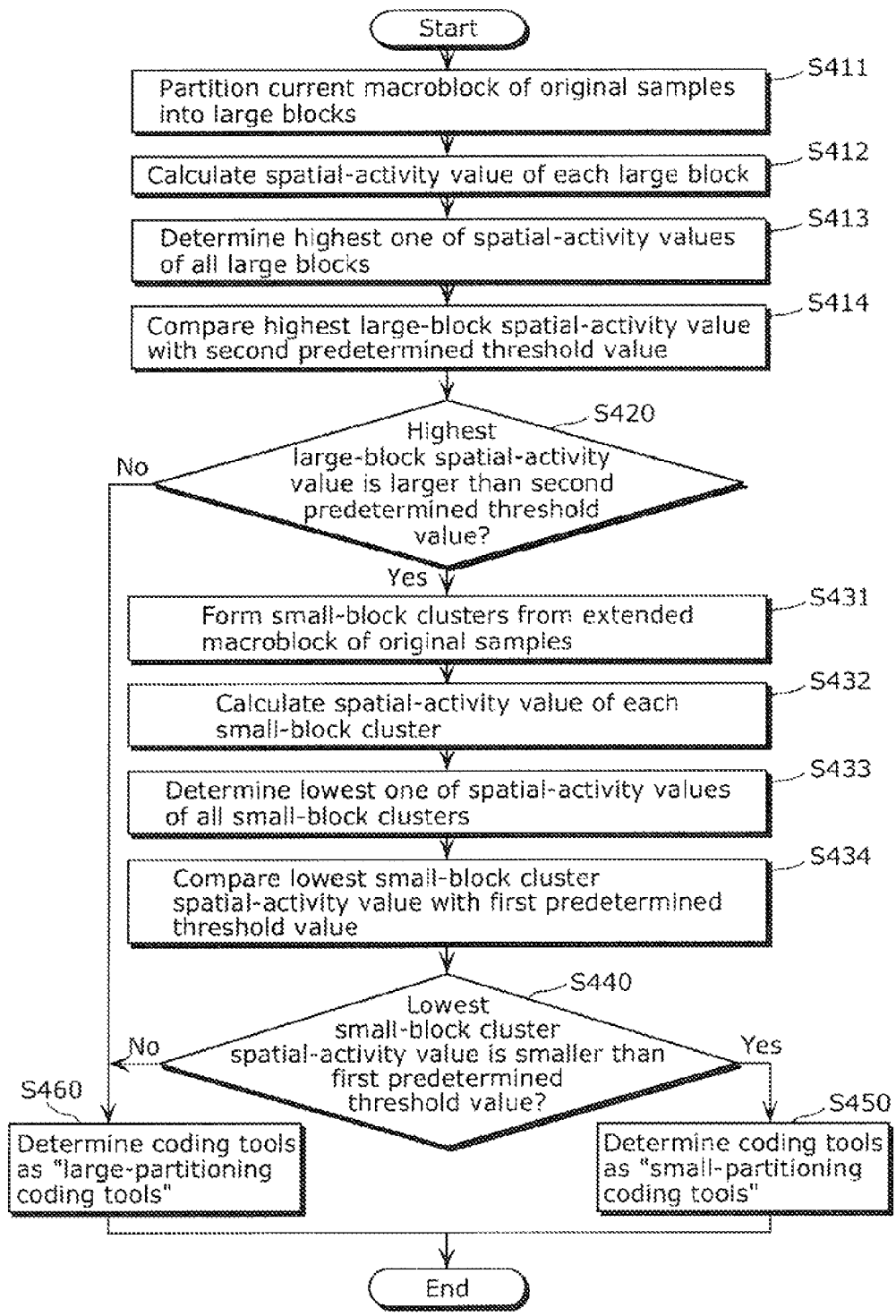
[FIG. 13]

Next, the operations in the flowchart shown in FIG. 12 are described in more detail with reference to FIG. 13. FIG. 13 is a flowchart indicating details of exemplary operations performed by the spatial-activity condition evaluation unit 321 according to Embodiment 2 of the present invention. The same operations as shown in FIG. 12 are assigned with the same reference signs.

First, the large-block partition unit 501 partitions a current M×N macroblock into G×H large blocks (S411). Here, G denotes the number of samples in width, and M is divisible by G. Whereas, H denotes the number of samples in height and N is divisible by H. Examples of G and H values are 8 and 8, respectively. FIG. 8 shows an example of the partitioning of an M×N macroblock into plural G×H large blocks.

Next, the large-block spatial-activity value calculation unit 502 calculates the spatial-activity value of each of the large blocks (large-block spatial-activity value) (S412). The spatial-activity value indicates the amount of fluctuation in sample values within the large block. The spatial-activity value is larger than or equal to zero. An exemplary method of calculating the spatial-activity value of the large block (LargeBlockSpatialAct) is represented as the following Expression (1).

$$LargeBlockSpatialAct = \text{variance}(LargeBlock) = \frac{\sum_{h=0}^{H-1}\sum_{g=0}^{G-1}(x(h,g)^2)}{G \times H} - \left(\frac{\sum_{h=0}^{H-1}\sum_{g=0}^{G-1}x(h,g)}{G \times H}\right)^2 \quad [\text{Math. 1}]$$

Here, a large-block spatial-activity value is calculated as the statistical variance of sample values within the large block. Here, x (h, g) denotes the sample value at location (h, g) within the large block.

In addition, another exemplary method of calculating the spatial-activity value of the large block (LargeBlockSpatialAct) is represented as the following Expressions (2) and (3).

$$LargeBlockSpatialAct = \frac{\sum_{b=0}^{B-1}\left(SmallBlockSpatialAct - \min_{b=0}^{B-1}(SmallBlockSpatialAct)\right)}{B} \quad [\text{Math. 2}]$$

$$SmallBlockSpatialAct = \text{variance}(SmallBlock) = \frac{\sum_{f=0}^{F-1}\sum_{e=0}^{E-1}(x(f,e)^2)}{E \times F} - \left(\frac{\sum_{f=0}^{F-1}\sum_{e=0}^{E-1}x(f,e)}{E \times F}\right)^2 \quad [\text{Math. 3}]$$

Here, SmallBlock denotes a small block of E×F samples. E denotes the number of samples in width and G (large-block width) is divisible by E. In addition, F denotes the number of samples in height and H (large-block height) is divisible by F. Examples of E and F values are 24 and 24, respectively.

SmallBlockSpatialAct denotes a small-block spatial-activity value calculated as the statistical variance of sample values within the small block. Here, B denotes the number of small blocks within a current large block, x (f, e) denotes the sample value at a location (f, e) within the small block, and min (•) denotes the minimum/lowest value. FIG. 8 shows an example of the partitioning of an O×P extended macroblock into plural E×F small blocks.

In addition, another exemplary method of calculating the large-block spatial-activity value is represented as the following Expression (4).

$$LargeBlockSpatialAct = \max_{b=0}^{B-1}(SmallBlockSpatialAct) - \min_{b=0}^{B-1}(SmallBlockSpatialAct) \quad [\text{Math. 4}]$$

As with Expression (3), SmallBlockSpatialAct denotes a small-block spatial-activity value calculated as the statistical variance of sample values within the small block. Here, B denotes the number of small blocks within a current large block, min (•) denotes the minimum/lowest value, and max (•) denotes the maximum/highest value.

After the large-block spatial-activity values are calculated, the highest value calculation unit 503 determines the highest one of the spatial-activity values of all the large blocks in the current macroblock (S413).

Next, the spatial-activity value comparison unit 504 compares the highest large-block spatial-activity value with a second predetermined threshold value for spatial-activity values (S414). An example of the second predetermined threshold value is an integer value.

In the case where the highest spatial-activity value within the large block is equal to or smaller than the second threshold value (No in S420), the coding tool determining unit 509 determines and sets the "large-partitioning coding tools" as the coding tools (S460).

In the case where the highest spatial-activity value within the large block is larger than the second threshold value (Yes in S420), the evaluation of a spatial-activity condition is continued.

The small-block cluster formation unit 505 forms plural I×J small-block clusters, based on an O×P extended macroblock including the M×N current macroblock (S431). Here, I denotes the number of samples in width and I is divisible by E (small-block width). In addition, J denotes the number of samples in height and J is divisible by F (small-block height). I and J values may vary among different small-block clusters. Examples of (I, J) values include (8,8), (16, 4), (4, 16), (4, 12), and (12, 4). Each small-block cluster includes one or more small blocks located within the M×N macroblock. FIG. 8 shows an example of the partitioning of O×P extended macroblock into plural E×F small blocks and the formation of plural multiple-sized I×J small-block clusters from these partition E×F small blocks.

Next, the small-block cluster spatial-activity value calculation unit 506 calculates the spatial-activity value of each of the small-block clusters (small-block cluster spatial-activity value) (S432). The spatial-activity value indicates the amount of fluctuation in sample values within the small-block cluster. An exemplary method of calculating the spatial-activity value for a small-block cluster is represented as the following Expression (5).

$$ClusterSpatialAct = \text{variance}(SmallBlockCluster) = \qquad [\text{Math. 5}]$$
$$\frac{\sum_{i=0}^{I-1}\sum_{j=0}^{J-1}(x(i,j)^2)}{I \times J} - \left(\frac{\sum_{i=0}^{I-1}\sum_{j=0}^{J-1}x(i,j)}{I \times J}\right)^2$$

Another exemplary method of calculating the spatial-activity value for a small-block cluster is represented as the following Expression (6).

$$ClusterSpatialAct = \frac{\sum_{b=0}^{B-1}(SmallBlockSpatialAct)}{B} \qquad [\text{Math. 6}]$$

Here, as with Expression (3), SmallBlockSpatialAct denotes a small-block spatial-activity value calculated as the statistical variance of sample values within the small block. Here, B denotes the number of small blocks within a current small-block cluster.

After the small-block cluster spatial-activity values are calculated, the lowest value calculation unit 507 determines the lowest one of the spatial-activity values of all the small-block clusters in the current extended macroblock.

Subsequently, the spatial-activity value comparison unit 508 compares the lowest one of the small-block cluster spatial-activity values with a first predetermined spatial-activity value (S434). An example of the first threshold value is an integer value.

In the case where the lowest spatial-activity value in the small-block cluster is smaller than the first threshold value (Yes in S440), the coding tool determination unit 509 determines and sets the "small-partitioning coding tools" as the coding tools (S450).

In the case where the lowest spatial-activity value in the small-block cluster is not smaller than the first threshold value, (No in S440), the coding tool determination unit 509 determines and sets the "large-partitioning coding tools" as the coding tools.

As described above, the spatial-activity condition evaluation unit 321 determines the coding tools for the current macroblock, based on the spatial-activity value of the current macroblock.

In Embodiment 2, as shown in the above descriptions, it is also good to compare the spatial-activity values in units of a large block, and only when a second spatial-activity value is equal to or smaller than the second threshold value, compare the spatial-activity value in unit of a small-block cluster. Alternatively, it is also good to perform, in parallel processing, comparison of the spatial-activity values in units of a large block and comparison of the spatial-activity values in units of a small-block cluster.

Returning to FIG. 11, next, the prediction type evaluation unit 322 determines whether or not the inter prediction mode can be applied to the current macroblock (S330). More specifically, the prediction type evaluation unit 322 checks whether or not a current picture including the current macroblock is inter coded. The picture to be inter coded is coded using a (normally, motion compensated) prediction result that is obtained from a coded reference picture.

In the case where the current picture is not inter coded (No in S330), the coding unit 330 codes the current macroblock using the coding tools determined by evaluating the spatial-activity condition (S350).

Figure 14:
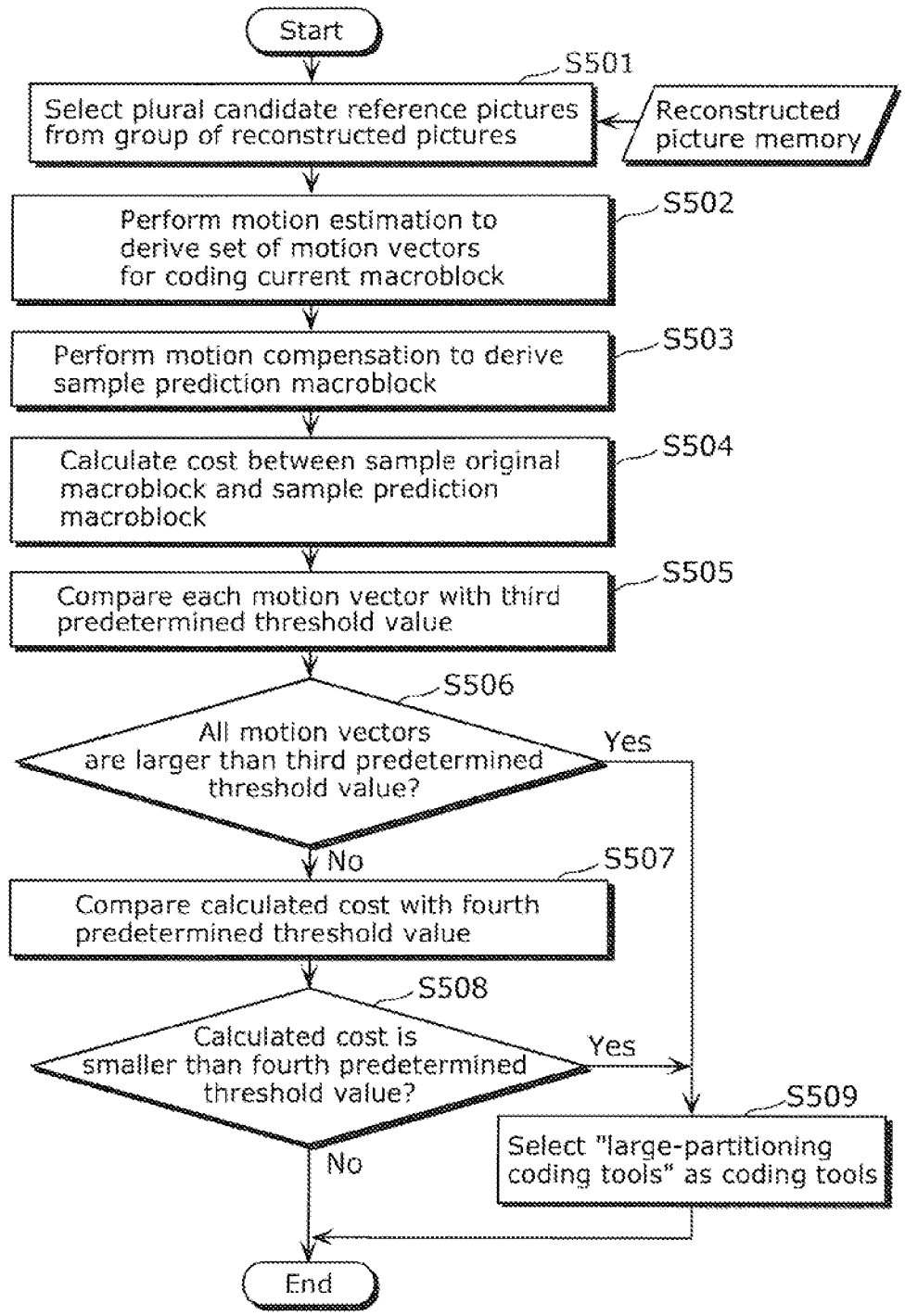
[FIG. 14]

In the case where the current picture is inter coded (Yes in S330), the motion-activity condition evaluation unit 324 evaluates the motion-activity condition as the second condition for selecting the most appropriate coding tools to code the current macroblock (S340). The coding tools determined by the spatial-activity condition evaluation unit 321 may be modified by the motion-activity condition evaluation unit 324 as shown in FIG. 14 in detail.

The motion-activity condition evaluation unit 324 is described in more detail with reference to FIG. 14. FIG. 14 is a flowchart indicating exemplary operations performed by the motion-activity condition evaluation unit 324 according to Embodiment 2 of the present invention.

First, the reference picture selection unit 701 selects plural candidate reference pictures from the group of reconstructed pictures stored in the picture memory unit 414 (S501). A picture in this case can be referred to as a frame picture or a field picture.

Next, the motion estimation unit 702 performs motion estimation on the candidate reference pictures, and thereby deriving a set of plural motion vectors for the uncompressed original macroblock of M×N samples (S502). Each of the derived motion vectors is associated with a reference picture as a reference destination.

Next, the motion compensation unit 703 performs motion compensation on the associated reference picture using the set of derived motion vectors, and thereby deriving a prediction block of M×N samples (S503).

Next, the cost calculation unit 704 calculates a cost value, based on the differences of sample values between the derived prediction block of M×N samples and the original block of M×N samples (S504). An exemplary Expression for calculating a cost value is represented as the following Expression (7).

[Math. 7]

$$Cost = DiffCost + Lambda * MVCost$$

Here, DiffCost is the cost component that is calculated depending on the differences between prediction samples and original samples. One example of DiffCost calculation result is the sum of absolute differences between the prediction samples and the original samples. Lambda is a constant value. MVCost denotes the cost value that is calculated depending on the derived motion vectors. Lambda can be a zero value, and in this case, the MVCost component can be ignored.

With the execution of the above described processes (S501 to S504), the correlation between the current original picture and the previous decoded picture is calculated. As shown in Expression 7, the smaller the cost value is, the higher the correlation is.

Next, the motion vector comparison unit 706 compares each of the absolute values of the motion vectors derived by the motion estimation unit 702 with the third predetermined threshold value for the motion vector (S505). An example of the third predetermined threshold value is an integer value.

In the case where the absolute values of the respective components of the motion vector are larger than the third predetermined threshold value (Yes in S506), the coding tool determination initialization unit 707 determines and sets the "large-partitioning coding tools" as the coding tools (S509). This is the completion of the motion-activity condition evaluation processes.

When the motion vector is larger than the third threshold value, there is a large motion between pictures, and the continuity therebetween is small. Accordingly, subjective image quality degradation is suppressed due to the large motion between the pictures even when distortion occurs in the current macroblock. For this reason, it is possible to increase the coding efficiency by selecting the "large-partitioning coding tools" in the case of a large motion.

In the case where the absolute values of one or more motion vectors are equal to or smaller than the third predetermined threshold value (No in S506), the cost comparison unit 705 compares the cost value calculated by the cost calculation unit 704 with the fourth predetermined threshold value for cost values (S507). An example of the fourth threshold value is an integer value.

In the case where the calculated cost value is smaller than the fourth threshold value (Yes in S508), the coding tool determination initialization unit 707 determines and sets the "large-partitioning coding tools" as the coding tools (S509). This is the completion of the motion-activity condition evaluation processes.

As described above, a cost value is a value that is calculated based on a sum of absolute differences or the like, and a smaller cost value indicates a higher coding efficiency. In other words, when a cost value is smaller than the fourth threshold value, the coding efficiency is sufficiently excellent, and it is possible to sufficiently increase the coding efficiency by selecting the "large-partitioning coding tools".

When a calculated cost value is equal to or larger than the fourth threshold value (No in S508), the coding tools determined by the spatial-activity condition evaluation unit 321 are not changed, and the motion-activity condition evaluation processes are completed. In other words, the coding conditions is determined based on the result of the coding condition determination by the spatial-activity condition evaluation unit 321.

Returning to FIG. 11, the coding unit 330 codes the image of the current macroblock using the coding tools selected as described above (S350).

As described above, the image coding apparatus 300 according to Embodiment 2 of the present invention performs evaluation of the spatial-activity conditions and motion-activity conditions, and determines the coding conditions for coding the current blocks based on the evaluation results.

More specifically, in the case where an absolute value of a motion vector is larger than the third threshold value, the image coding apparatus 300 determines a coding condition (coding condition for large partitioning) for coding the current block in units of a sub-block having a large partitioning size. In the case of a large motion, it is preferable that the compression rate is prioritized by selecting the coding condition for large partitioning in this way due to the small continuity between the images (pictures).

In addition, the image coding apparatus 300 determines the coding condition for large partitioning, also in the case where the absolute value of a motion vector is equal to or smaller than the third threshold value and the cost value is smaller than the fourth threshold value. Since the cost value smaller than the fourth threshold value indicates that the current block can be coded effectively, it is possible to increase the coding efficiency by determining the coding condition for large partitioning.

In addition, in the case where an absolute value of the motion vector is equal to or smaller than the third threshold value and the cost value is larger than the fourth threshold value, the image coding apparatus 300 determines a coding condition for the current block, according to the evaluation results of the spatial-activity conditions for the current block and an extended block.

More specifically, the image coding apparatus 300 calculates the spatial-activity values of the plural large blocks included in the current block, and when a second spatial-activity value that is the highest one of the calculated spatial-activity values is equal to or smaller than the second threshold value, determines the coding condition for large partitioning. In this way, since the current block has a small information amount when the second spatial-activity value is equal to or smaller than the second threshold value, it is possible to effectively increase the coding efficiency by using the coding condition for large partitioning.

Furthermore, when the second spatial-activity value is larger than the second threshold value, the image coding apparatus 300 calculates the spatial-activity values of the small-block clusters included in the extended block. Next, when a first spatial-activity value that is the lowest spatial-activity value in the calculated spatial-activity values is smaller than the first threshold value, the image coding apparatus 300 determines the coding condition (coding condition for small partitioning) for coding the current block into sub-blocks having a small partitioning size.

Since the current block has a large amount of information when the second spatial-activity value is larger than the second threshold value, it is impossible to obtain an effect equivalent to the case where the second spatial-activity value is equal to or smaller than the second threshold value even when the coding tools for large partitioning are determined. Accordingly, when the first spatial-activity value is found to be smaller than the first threshold value by comparison, the image coding apparatus 300 selects the coding condition for small partitioning.

In other words, the image coding apparatus 300 selects the coding condition for small partitioning when the current block includes, at least partially, a flat region. In this way, it is possible to suppress occurrence of ringing artifacts and blocking artifacts in a flat image, and concurrently suppress image quality degradation.

Since the small-block cluster is generated based on the extended block that includes the current block and is larger than the current block when the spatial-activity values of small-block cluster are calculated, it is possible to use the image information of not only the current block but also the surrounding images. For example, when a partial region of the current block has a low complexity, that is, the region is flat, it is possible to determine the coding condition based on whether or not the regions included in the surrounding blocks are also flat.

When distortion in the current region propagates in the case where the partial region (current region) of the current block is flat and the surrounding blocks are also flat, the distortion is likely to be noticeable and results in an image quality degradation. In contrast, when distortion in the current region propagates in the case where the current region is flat but the surrounding blocks are complex, the distortion is unlikely to be noticeable due to the complexity of the surrounding blocks, and thus the image quality degradation is suppressed.

Accordingly, as in Embodiment 2 of the present invention, it is possible to select the coding condition based on the image information of the surrounding blocks by utilizing the spatial-activity value of the small-block cluster including the current region and the surrounding block regions. More specifically, as described above, when the lowest one of the spatial-activity values of the small-block cluster is equal to or smaller than the first threshold value, the image coding apparatus 300 selects the first coding condition for small partitioning as the coding condition for the current block. In this way, coding is performed using the small partitioning size when the surrounding images are also flat. This makes it possible to prevent distortion propagation within the current block and thereby suppressing image quality degradation.

In the flowchart shown in FIG. 14, there is no need to make comparison of cost values. More specifically, there is no need to perform cost value calculation (S504) and make cost value comparison (S507 and S508).

In other words, the image coding apparatus 300 may select the large-partitioning coding tools when the absolute value of a motion vector is larger than the third threshold value, and when the absolute value of a motion vector is equal to or smaller than the third threshold value, the image coding apparatus 300 may determine the coding condition based on the coding condition determination result obtained by evaluating the spatial-activity condition.

Figure 15:
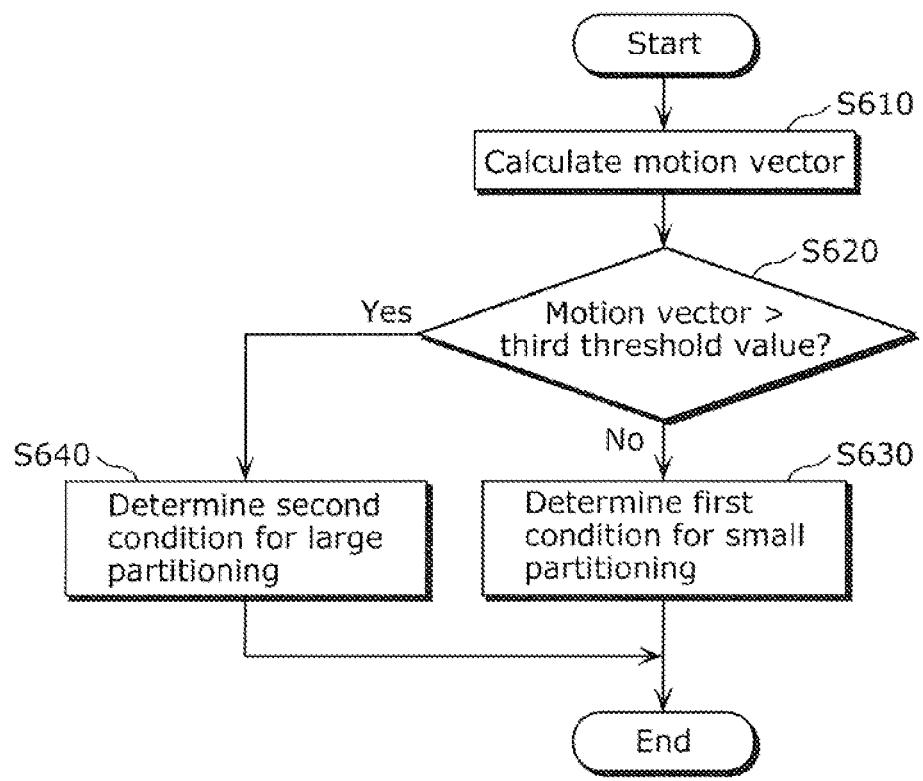
[FIG. 15]

Furthermore, in the flowchart shown in FIG. 5, the image coding apparatus 100 according to Embodiment 1 may determine the coding condition based only on a motion-activity condition, although the image coding apparatus 100 determines the coding condition based on a spatial-activity condition as shown in FIG. 6. More specifically, as shown in FIG. 15, the image coding apparatus 300 may determine the coding condition based on the magnitude of a motion vector.

First, the coding condition determination unit calculates the motion vector for the current block (S610). More specifically, the coding condition determination unit calculates the motion vector for the current block by performing a reference picture selection and a motion estimation.

Next, the coding condition determination unit compares the calculated motion vector with the third predetermined threshold value (S620). When the motion vector is equal to or smaller than the third threshold value (No in S620), the image coding apparatus 300 determines the first coding conditions for small partitioning ("small-partitioning coding tools") as the coding conditions for the current block (S630). When the motion vector is larger than the third threshold value (Yes in S620), the image coding apparatus 300 determines the second coding conditions for large partitioning ("large-partitioning coding tools") as the coding conditions for the current block (S640).

As described above, the image coding apparatus 300 may determine the coding condition based only on a motion vector. Also as described above, it is possible to increase the coding efficiency by selecting the "large-partitioning coding tools" in the case of a large motion. In this case, compared to the case of selecting the "small-partitioning coding tools", distortion easily propagates in a current macroblock, but the subjective image quality degradation is suppressed due to the large motion between the pictures.

[Embodiment 3]

The processing described in the aforementioned embodiments can be simply implemented by an independent computer system, by recording, in a recording medium, a program for implementing the configurations for the image coding methods and the image decoding methods described in the aforementioned embodiments. The recording medium may be any recording medium as long as the program can be recorded, such as a magnetic disk, an optical disc, a magnetic optical disk, an IC card, and a semiconductor memory.

Hereinafter, the applications to the image coding methods and the image decoding methods described in the aforementioned embodiments and systems using thereof will be described.

Figure 16:
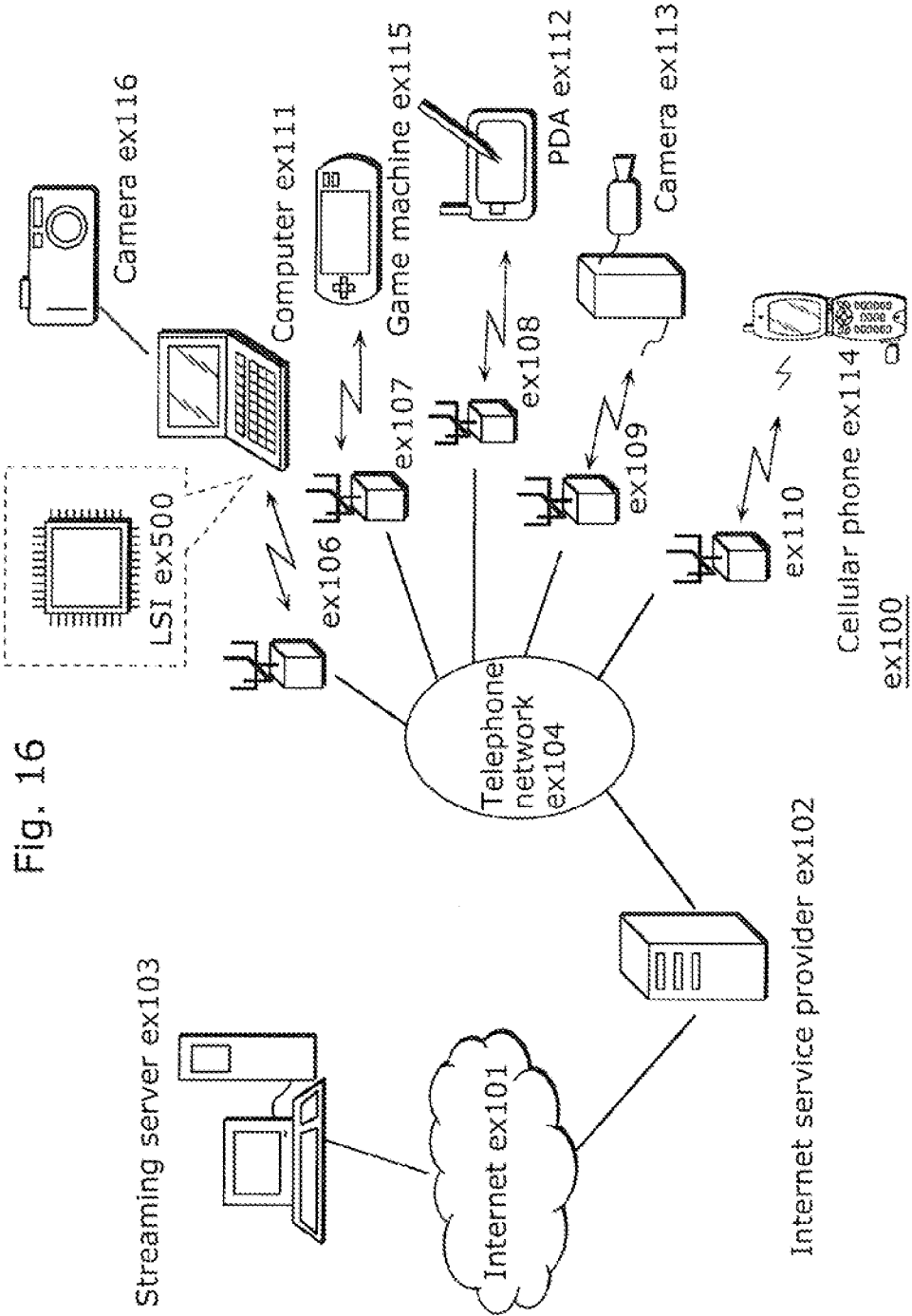
[FIG. 16]
FIG. 16 schematically shows an overall configuration of a content providing system for implementing content distribution services.

FIG. 16 schematically shows an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 16, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in the aforementioned embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the aforementioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and/or moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI (Large Scale Integration) ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving image data obtained by the camera may be transmitted. The video data is data coded by the LSI ex500 included in the cellular phone ex114.

Furthermore, the streaming server ex103 may be composed of servers and computers, and may process data in a decentralized manner, and either record or distribute the decentralized data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding methods and the image decoding methods described in the aforementioned embodiments may be used.

The cellular phone ex114 will be described as an example of such a device.

Figure 17:
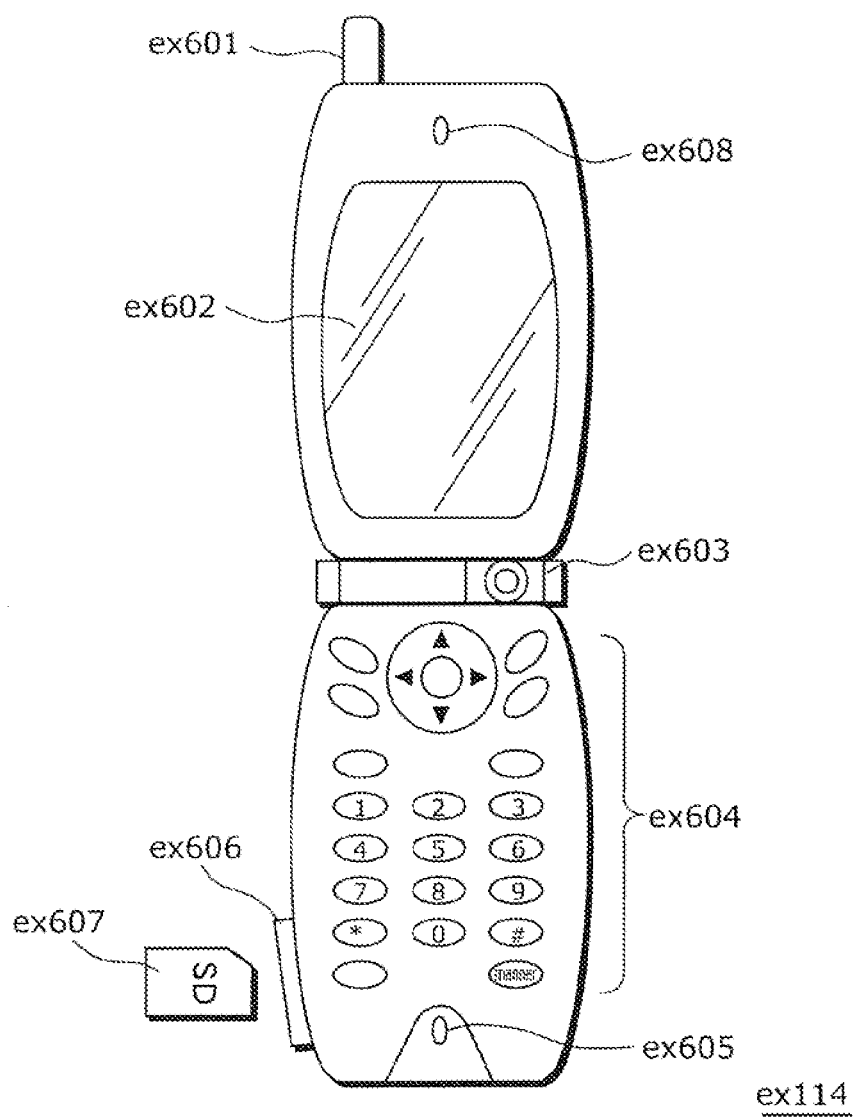
[FIG. 17]

FIG. 17 illustrates the cellular phone ex114 that uses the image coding methods and the image decoding methods described in the aforementioned embodiments. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of sound; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 18:
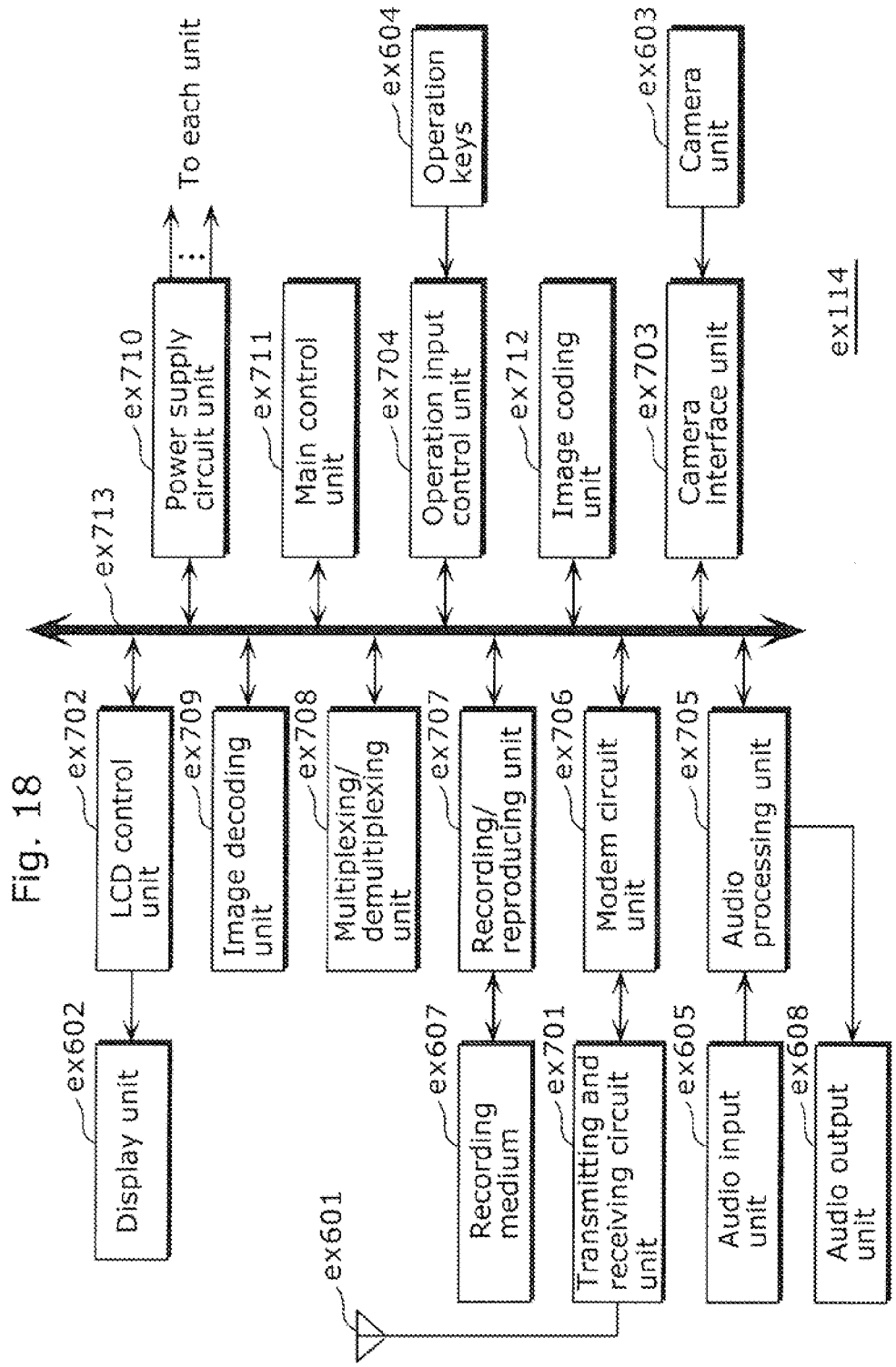
[FIG. 18]

Next, the cellular phone ex114 will be described with reference to FIG. 18. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the digital cell phone ex114 equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. When the image data is not transmitted, the image data captured by the camera unit ex603 can be displayed directly on the display unit ex602 via the camera interface unit ex703 and the LCD control unit ex702.

The image coding unit ex712 including the image coding apparatus as described in the present invention compresses and codes the image data supplied from the camera unit ex603 using the coding methods employed by the image coding apparatuses as shown in the aforementioned embodiments so as to transform the data into coded image data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bitstream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described in the present invention decodes the bitstream of the image data using the decoding methods corresponding to the coding methods as described in the aforementioned embodiments so as to generate video data to be reproduced, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 19:
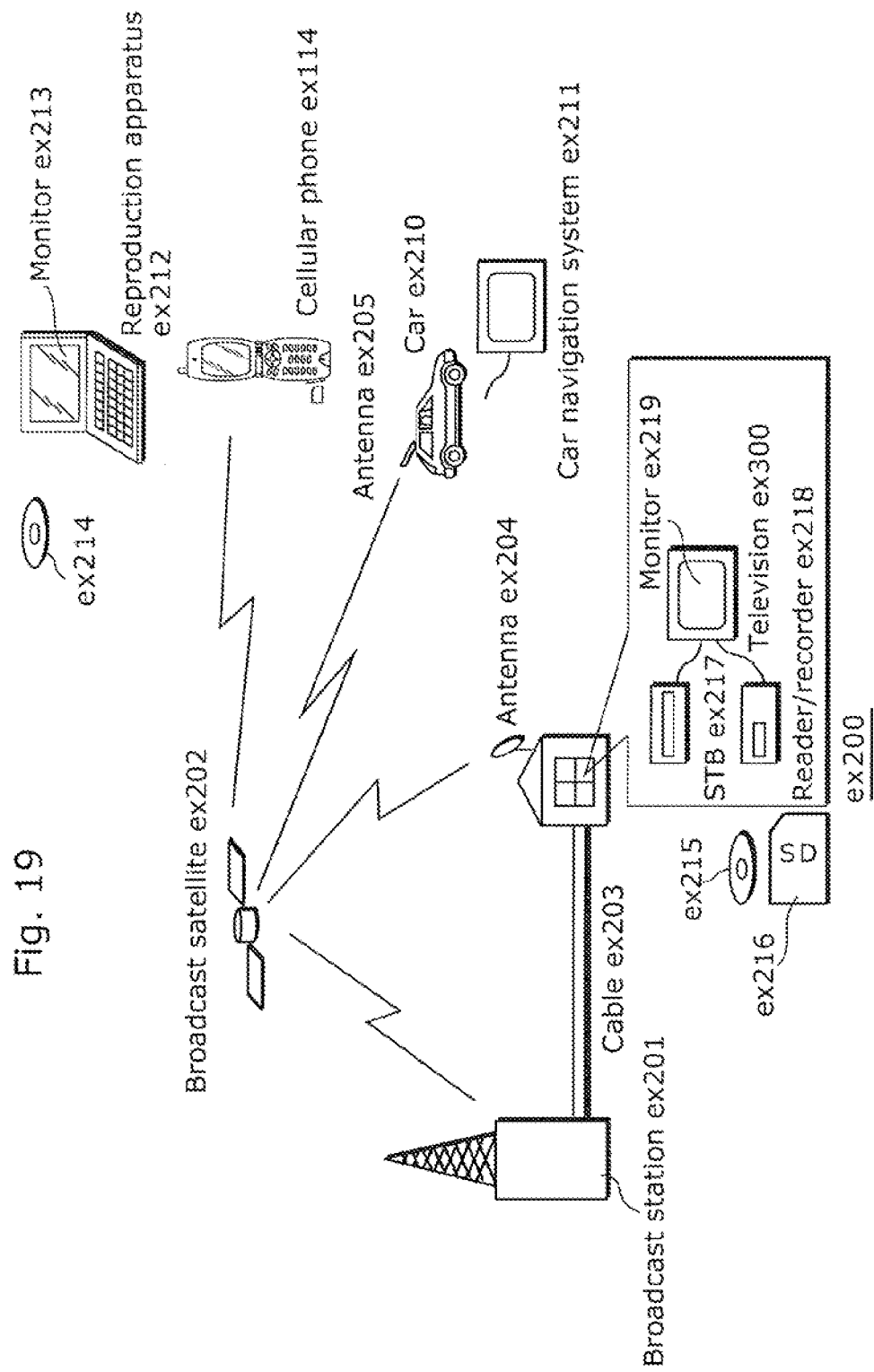
[FIG. 19]
FIG. 19 schematically shows an example of an overall configuration of a digital broadcasting system.

The present invention is not limited to the aforementioned system because terrestrial or satellite digital broadcasting has been in the news lately, and at least either the image coding apparatuses or the image decoding apparatuses described in the aforementioned embodiments can be incorporated into a digital broadcasting system as shown in FIG. 19. More specifically, a broadcast station ex201 communicates or transmits, via radio waves to a broadcast satellite ex202, audio data, video data, or a bitstream obtained by multiplexing the audio data and the video data. Upon receipt of the bitstream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bitstream and reproduces the decoded bitstream. Furthermore, a reader/recorder ex218 that reads and decodes such a bitstream obtained by multiplexing image data and audio data that are recorded on recording media ex215 and 216, such as a CD and a DVD may include the image decoding apparatuses as described in the aforementioned embodiments. In this case, the reproduced video signals are displayed on a monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or a base station or the like for reproducing video on a display device such as a car navigation system ex211 set in the car ex210.

Furthermore, the image decoding apparatuses or the image coding apparatuses as described in the aforementioned embodiments can be implemented in the reader/recorder ex218 (i) for reading and decoding the video data, the audio data, or the coded bitstream obtained by multiplexing the video data and the audio data, or (ii) for coding the video data, the audio data, or the coded bitstream obtained by multiplexing the video data and the audio data and recording the resulting multiplexed data on the recording medium ex215. Here, the video data and the audio data are recorded on the recording medium ex215, such as a BD and a DVD. In this case, the reproduced video signals are displayed on the monitor ex219. Furthermore, the video signals can be reproduced by another device or system, using the recording medium ex215 on which the coded bitstream is recorded. For example, another reproduction apparatus ex212 can reproduce the video signals on a monitor ex213, using a recording medium ex214 on which the coded bitstream is copied.

Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 20:
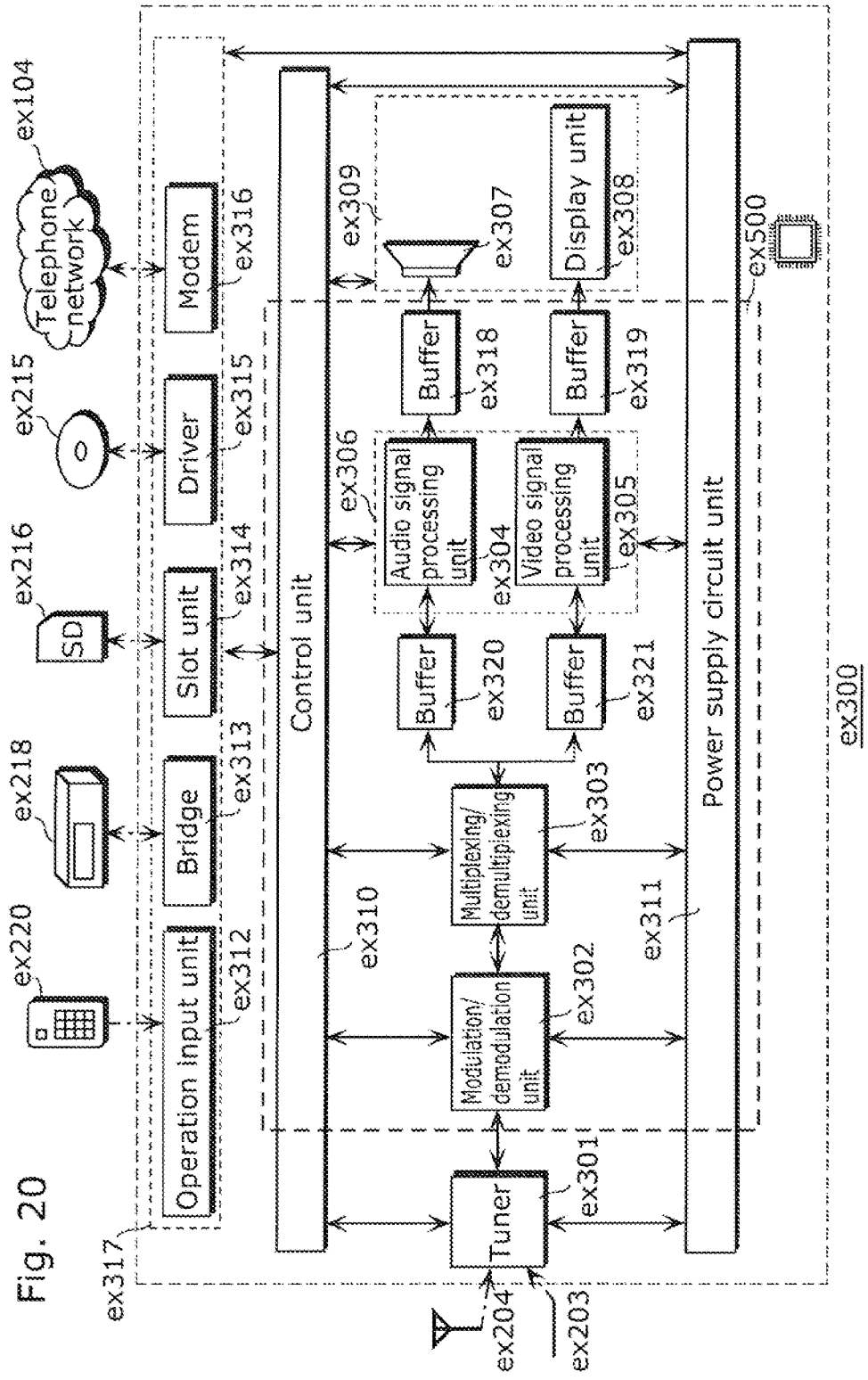
[FIG. 20]

FIG. 20 the television (receiver) ex300 that uses the image coding methods and the image decoding methods described in the aforementioned embodiments. The television ex300 includes: a tuner ex301 that obtains or provides a bitstream of video information through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data. The television ex300 further includes: a signal processing unit ex306 including an audio signal processing unit ex304 and a video signal processing unit ex305 that decode each of the audio data and video data or code the audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that performs integral control on each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration will be described in which the television ex300 decodes data obtained from outside through the antenna ex204 and the like and reproduces the decoded data. In the television ex300, upon receipt of a user operation from a remote controller ex220 and the like, the multiplexing/demultiplexing unit ex303 demultiplexes the video data and audio data demodulated by the modulation/demodulation unit ex302, under control of the control unit ex310 including a CPU and the like. Furthermore, the audio signal processing unit ex304 decodes the demultiplexed audio data, and the video signal processing unit ex305 decodes the demultiplexed video data, using the decoding method(s) described in the aforementioned embodiments, in the television ex300. The output unit ex309 provides the decoded video signal and audio signal outside, respectively. When the output unit ex309 provides the video signal and the audio signal, the signals may be temporarily stored in buffers ex318, ex319, and the like, so that the signals are reproduced in synchronization with each other. Furthermore, the television ex300 may read a coded bitstream not through a broadcast or the like but from the recording media ex215 and ex216, such as a magnetic disk, an optical disc, and an SD card. Next, a configuration will be described in which the television ex300 codes an audio signal and a video signal, and transmits the data outside or writes the data on a recording medium. In the television ex300, upon receipt of a user operation from the remote controller ex220 or the like, the audio signal processing unit ex304 codes an audio signal, and the video signal processing unit ex305 codes a video signal, under control of the control unit ex310 using the coding method(s) as described in the aforementioned embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320, ex321, and the like so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving AV inputs from a microphone and a camera other than the configuration for obtaining audio and video data from a broadcast and a recording medium, and may code the obtained data. Although the television ex300 can code, multiplex, and provide outside data here, it may be not capable of coding, multiplexing, and providing outside data but capable of only one of receiving, decoding, and providing outside data.

Furthermore, when the reader/recorder ex218 reads or writes a coded bitstream from or on a recording medium, one of the television ex300 and the reader/recorder ex218 may decode or code the coded bitstream, and the television ex300 and the reader/recorder ex218 may share the decoding and coding.

Figure 21:
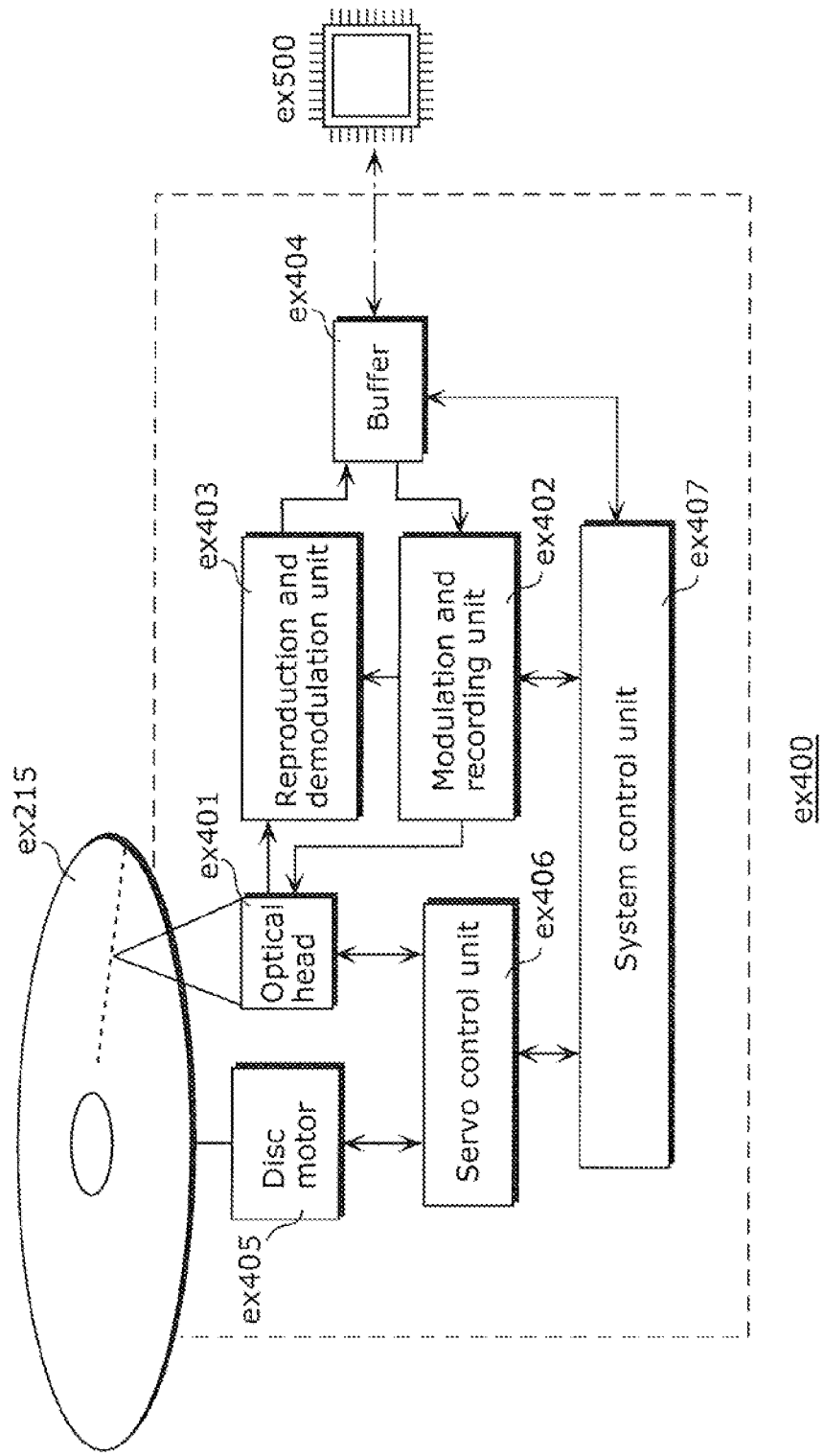
[FIG. 21]

As an example, FIG. 21 illustrates a configuration of an information reproducing/recording unit ex400 when data is read or written from or on an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disc motor ex405 rotates the recording medium ex215. A servo control unit ex406 moves the optical head ex401 to a predetermined information track while controlling the rotation drive of the disc motor ex405 so as to follow the laser spot. The system control unit ex407 controls the whole information reproducing/recording unit ex400. The reading and writing processes can be implemented by means that the system control unit ex407 uses various information stored in the buffer ex404 and generates and adds new information as necessary, and by means that the modulation recording unit ex402, the reproduction demodulating unit ex403, and the servo control unit ex406 record and reproduce the information through the optical head ex401 in a coordinated manner. The system control unit ex407 is configured with, for example, a microprocessor, and executes processing by causing a computer to execute a program for read and write.

Although the optical head ex401 irradiates a laser spot in the above descriptions, it may perform high-density recording using near field light.

Figure 22:
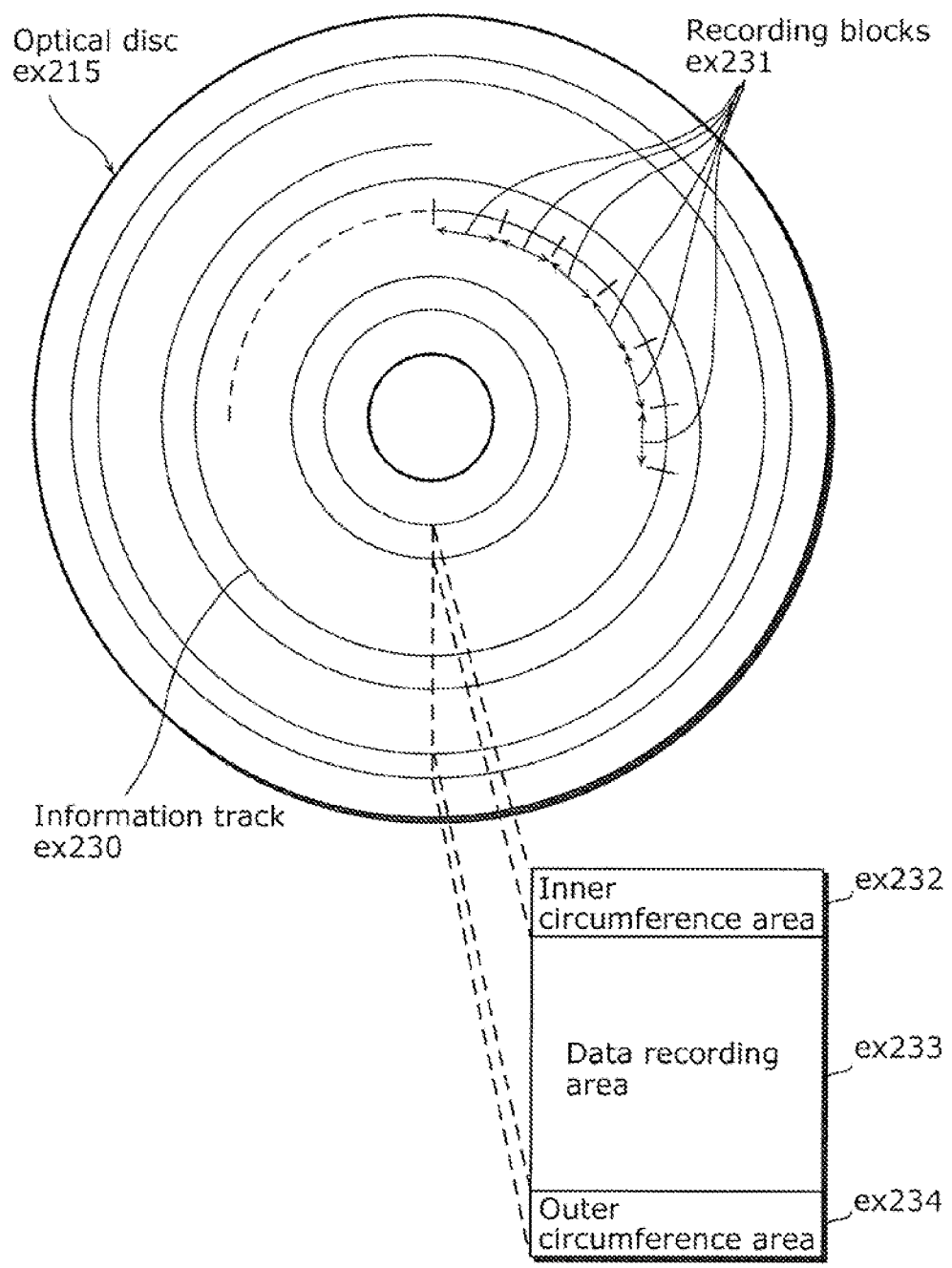
[FIG. 22]

FIG. 22 schematically illustrates the recording medium ex215 that is an optical disc. On the recording surface of the recording medium ex215, guide grooves are spirally formed, and an information track ex230 records, in advance, address information indicating an absolute position on the disc according to change in the shape of the guide grooves. The address information includes information for determining positions of recording blocks ex231 each of which is a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disc having a single layer, such as a DVD and a BD is described as an example in the description, the optical disc is not limited to such an optical disc, and may be an optical disc having a multilayer structure and capable of being recorded on a part other than the surface. Furthermore, the optical disc may have a structure for multi-dimensional recording/reproduction, such as recording of information using light of colors with different wavelengths in the same portion of the optical disc and recording information having different layers from various angles.

Furthermore, the car ex210 having the antenna ex205 can receive data from the satellite ex202 and the like, and reproduce video on the display device such as the car navigation system ex211 in the car ex210, in a digital broadcasting system ex200. Here, a configuration of the car navigation system ex211 will be a configuration, for example, including a GPS receiving unit from the configuration illustrated in FIG. 20. The same will be true for the configuration of the computer ex111, the cellular phone ex114, and others. Furthermore, similarly to the television ex300, a terminal such as the cellular phone ex114 may have 3 types of implementation configurations as follows: (i) a transmitting and receiving terminal including both a coding apparatus and a decoding apparatus, (ii) a transmitting terminal including only a coding apparatus, and (iii) a receiving terminal including only a decoding apparatus.

As such, the image coding methods and the image decoding methods in the aforementioned embodiments can be used in any of the devices and systems described. Thus, the advantages described in the aforementioned embodiments can be obtained.

Furthermore, the present invention is not limited to Embodiments, and various modifications and revisions are possible without departing from the scope of the present invention.

[Embodiment 4]

Figure 23:
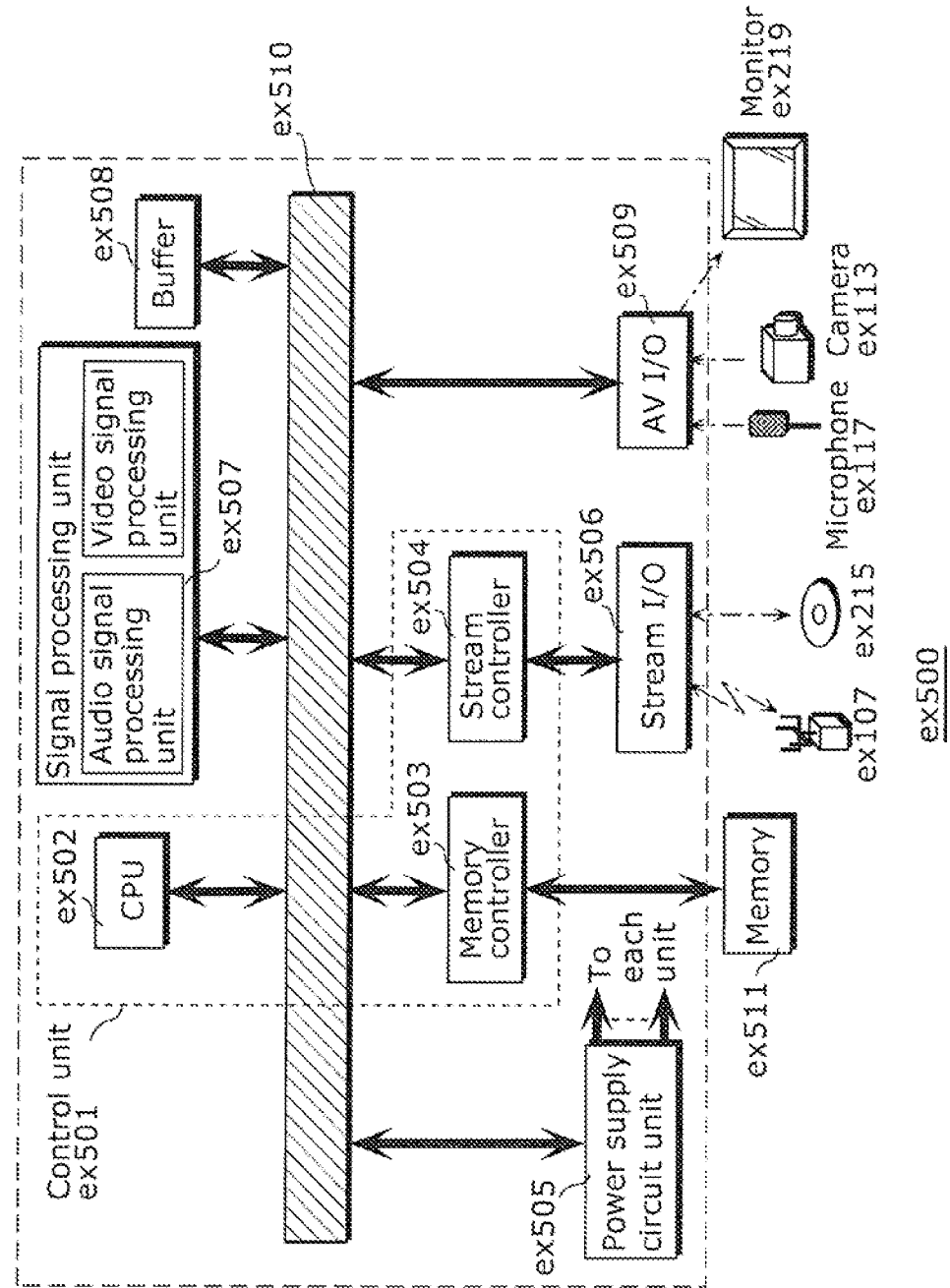
[FIG. 23]

Each of the image coding method, the image coding apparatus, the image decoding method, and the image decoding apparatus in each of the embodiments is typically achieved in the form of an integrated circuit or a Large Scale Integrated (LSI) circuit. As an example of the LSI, FIG. 23 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in the aforementioned embodiments. Furthermore, the signal processing unit ex507 sometimes multiplexes the coded audio data and the coded video data, and a stream I/O ex506 provides the multiplexed data outside. The provided bitstream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511 and the like, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in the aforementioned embodiments. Furthermore, a decoded audio signal and a decoded video signal may be temporarily stored in the buffer ex508 and the like so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the aforementioned descriptions, it may be included in the LSI ex500. The buffer ex508 is not limited to one buffer, but may be composed of plural buffers. Furthermore, the LSI ex500 may be made into one or plural chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Coding methods, coding apparatuses, error detection methods, error detection apparatuses, decoding methods, and decoding apparatuses according to the present invention have been described above based on embodiments, but the present invention is not limited to these embodiments. Those skilled in the art will readily appreciate that not only modifications to and variations of the exemplary embodiments are possible and but also other embodiments obtainable by arbitrarily combining the structural elements, steps, or the like in the exemplary embodiments are possible without materially departing from the scope of the present invention. Accordingly, all such modifications, variations, and embodiments are intended to be included within the scope of the present invention.

[Industrial Applicability]

The present invention provides advantageous effects of being able to suppress increase in an operation amount, and sufficiently suppress degradation in image quality. The present invention is applicable to image coding apparatuses which code still images and moving images. For example, the present invention is applicable to various kinds of AV apparatuses such as cellular phones, digital cameras, BD recorders, digital television sets.

[Reference Signs List]

100, 300 Image coding apparatus

110 Partition unit 120, 320 Coding condition determination unit
121 Spatial-activity value calculation unit
122 Comparison unit
123 Determination unit
130, 330 Coding unit
201 Original image
202 Extended block
203 Current block
204 Coding condition
205 Coded image
211 Spatial-activity value
212 Comparison result
310 Sample extraction unit
321 Spatial-activity condition evaluation unit
322 Prediction type evaluation unit
323, 708, 709 Switch unit
324 Motion-activity condition evaluation unit
325 OR gate unit
331 Image coding unit
332 Image decoding unit
333 Picture memory unit
334 Entropy coding unit
401 Available prediction type information
402 Original picture
403, 404 Original sample
405, 806 Coding tool determination signal
406, 604, 608 Control signal
407, 408, 409 Coding tool determination signal
410 Inter prediction sample
411 Final coding tool determination signal
412 Quantization residual
413 Reconstructed sample
414 Reconstructed picture
415 Compressed bitstream
501 Large-block partition unit
502 Large-block spatial-activity value calculation unit
503 Highest value calculation unit
504, 508 Spatial-activity value comparison unit
505 Small-block cluster formation unit
506 Small-block cluster spatial-activity value calculation unit
507 Lowest value calculation unit
509 Coding tool determining unit
601 Large-block sample
602 Large-block spatial-activity value
603 Highest spatial-activity value
605 Small-block cluster sample
606 Small-block cluster spatial-activity value
607 Lowest spatial-activity value
701 Reference picture selection unit
702 Motion estimation unit
703 Motion compensation unit
704 Cost calculation unit
705 Cost comparison unit
706 Motion vector comparison unit
707 Coding tool determination initialization unit
801 Reference picture
802 Reference picture index
803 Motion vector
804, 808 Control signal
805 Initialization signal
807 Cost value
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116. Camera
ex114 Cellular phone with camera (cellular phone)
ex115 Game machine
ex117 Microphone
ex200 Digital broadcasting system
ex201 Broadcast station
ex202 Broadcast satellite (Satellite)
ex203 Cable
ex204, ex205, ex601 Antenna
ex210 Car
ex211 Car navigation
ex212 Reproduction apparatus
ex213, ex219 Monitor
ex214, ex215, ex216, ex607 Recording media
ex217 Set Top Box
ex218 Reader/recorder
ex220 Remote controller
ex230 Information track
ex231 Recording block
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit
ex309 Output unit
ex310, ex501 Control unit
ex311, ex505, ex710 Power source circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproduction/recording unit
ex401 Optical head
ex402 Modulation recording unit
ex403 Reproduction demodulation unit
ex405 Disc motor
ex406 Servo control unit
ex407 System control unit
ex500 LSI
ex502 CPU
ex503 Memory controller
ex504 Stream controller
ex506 Stream I/O
ex509 AV I/O
ex510 Bus
ex511 Memory
ex603 Camera unit
ex604 Operation key
ex605 Sound input unit
ex608 Sound output unit
ex701 Transmitting and receiving unit
ex702 LCD control unit
ex703 Camera interface unit (Camera I/F unit)
ex704 Operation input control unit
ex705 Audio processing unit ex706 Modem circuit unit
ex707 Recording and reproducing unit
ex708 Multiplexing/demultiplexing unit
ex709 Image decoding unit
ex711 Main control unit
ex712 Image coding unit
ex713 Synchronous bus

The invention claimed is:

1. An image coding method of coding an original image, the image coding method comprising:
   partitioning the original image into a plurality of blocks;
   determining a coding condition for a current block that is one of the blocks each having a predetermined size; and
   coding the current block according to the determined coding condition,
   wherein the determining of the coding condition for the current block includes determining the coding condition for the current block, based on a spatial-activity value that is a value indicating complexity of the current block, the spatial-activity value becoming smaller as the current block becomes a flatter image,
   wherein the determining of the coding condition based on the spatial-activity value includes:
   calculating a first spatial-activity value indicating complexity of at least a part of regions of the current block, the first spatial-activity value increasing as the complexity increases and becoming smaller as the part of regions of the current block becomes a flatter image;
   comparing the calculated first spatial-activity value with a first predetermined threshold value;
   determining, as the coding condition for the current block, a first coding condition indicating that the current block is coded in units of a sub-block having a first partitioning size, when the first spatial-activity value is smaller than the first predetermined threshold value; and
   determining, as the coding condition for the current block, a second coding condition indicating that the current block is coded in units of a sub-block having a second partitioning size larger than the first partitioning size, when the first spatial-activity value is equal to or larger than the first predetermined threshold value,
   wherein the calculating of the first spatial-activity value includes:
   forming a plurality of small-block clusters each including at least a part of regions of the current block, based on an extended block including at least the current block; and
   calculating a small-block cluster spatial-activity value (i) that is a value indicating complexity of a corresponding one of the small-block clusters, and (ii) that becomes smaller as the corresponding small-block cluster becomes a flatter image, and calculating, as the first spatial-activity value, a lowest value among the calculated small-block cluster spatial-activity values, and
   wherein the extended block is larger than the current block and less than the size of a whole picture.

2. The image coding method according to claim 1, wherein the determining of the coding condition further includes:
   partitioning the current block into a plurality of large blocks;
   calculating a large-block spatial-activity value (i) that is a value indicating complexity of a corresponding one of the large blocks, and (ii) that becomes smaller as the corresponding large block becomes a flatter image, and calculating, as a second spatial-activity value, a highest value among the calculated large-block spatial-activity values;
   comparing the calculated second spatial-activity value with a second predetermined threshold value;
   determining the second coding condition as the coding condition for the current block when the second spatial-activity value is equal to or smaller than the second predetermined threshold value; and
   determining the coding condition for the current block by the calculating and comparing of the first spatial-activity value when the second spatial-activity value is larger than the second predetermined threshold value.

3. The image coding method according to claim 1, wherein the value indicating the complexity of the current block is a value indicating an amount of fluctuation in sample values of a plurality of samples included in the current block.

4. The image coding method according to claim 1,
   wherein the determining of the coding condition for the current block further includes determining the coding condition for the current block based on a motion for the current block, and
   wherein the determining of the coding condition based on the motion includes:
   calculating a motion vector for the current block;
   comparing an absolute value of the calculated motion vector with a third predetermined threshold value;
   determining the second coding condition as the coding condition for the current block when the absolute value of the motion vector is larger than the third predetermined threshold value; and
   determining the coding condition for the current block, according to a result of the determination of the coding condition based on the spatial-activity value, when the absolute value of the motion vector is equal to or smaller than the third predetermined threshold value.

5. The image coding method according to claim 4, wherein the determining of the coding condition based on the motion further includes:
   generating a prediction block for the current block by performing motion compensation using the calculated motion vector;
   calculating a cost value indicating a coding efficiency of the current block using the current block, the prediction block, and the motion vector;
   comparing the cost value with a fourth predetermined threshold value when the absolute value of the motion vector is equal to or smaller than the third predetermined threshold value;
   determining the second coding condition as the coding condition for the current block when the cost value is smaller than the fourth predetermined threshold value; and
   determining the coding condition for the current block, according to the result of the determination of the coding condition based on the spatial-activity value, when the cost value is equal to or larger than the fourth predetermined threshold value.

6. The image coding method according to claim 5, wherein the cost value is calculated based on a sum of absolute differences between the current block and the prediction block.

7. The image coding method according to claim 1, wherein the sub-block having either the first partitioning size or the second partitioning size is a unit of processing based on which at least one of intra prediction, motion compensation, and frequency transformation is executed.

8. An image coding apparatus which codes an original image, the image coding apparatus comprising:
   a partition unit configured to partition the original image into a plurality of blocks;

a coding condition determination unit configured to determine a coding condition for a current block that is one of the blocks each having a predetermined size; and a coding unit configured to code the current block according to the coding condition determined by the coding condition determination unit, wherein the coding condition determination unit includes:

a spatial-activity value calculation unit configured to calculate a spatial-activity value that is a value indicating complexity of at least a part of regions of the current block, the spatial-activity value increasing as the complexity increases and becoming smaller as the part of regions of the current block becomes a flatter image;

a comparison unit configured to compare the spatial-activity value calculated by the spatial-activity value calculation unit with a predetermined threshold value; and a determination unit configured to:

determine, as the coding condition for the current block, a first coding condition indicating that the current block is coded in units of a sub-block having a first partitioning size, when the spatial-activity value is smaller than the predetermined threshold value; and determine, as the coding condition for the current block, a second coding condition indicating that the current block is coded in units of a sub-block having a second partitioning size larger than the first partitioning size, when the spatial-activity value is equal to or larger than the predetermined threshold value, wherein spatial-activity value calculation unit is configured to:

form a plurality of small-block clusters each including at least a part of regions of the current block, based on an extended block including at least the current block; and calculate a small-block cluster spatial-activity value (i) that is a value indicating complexity of a corresponding one of the small-block clusters, and (ii) that becomes smaller as the corresponding small-block cluster becomes a flatter image, and calculating, as the first spatial-activity value, a lowest value among the calculated small-block cluster spatial-activity values, and wherein the extended block is larger than the current block and less than the size of a whole picture.

9. A non-transitory computer-readable medium having a program stored thereon, the program causing a computer to execute an image coding method of coding an original image, the image coding method comprising:

partitioning the original image into a plurality of blocks;

determining a coding condition for a current block that is one of the blocks each having a predetermined size; and coding the current block according to the determined coding condition, wherein the determining of the coding condition for the current block includes:

calculating a spatial-activity value indicating complexity of at least a part of regions of the current block, the spatial-activity value increasing as the complexity increases and becoming smaller as the part of regions of the current block becomes a flatter image;

comparing the calculated spatial-activity value with a predetermined threshold value;

determining, as the coding condition for the current block, a first coding condition indicating that the current block is coded in units of a sub-block having a first partitioning size, when the spatial-activity value is smaller than the predetermined threshold value; and determining, as the coding condition for the current block, a second coding condition indicating that the current block is coded in units of a sub-block having a second partitioning size larger than the first partitioning size, when the spatial-activity value is equal to or larger than the predetermined threshold value, wherein the calculating of the first spatial-activity value includes:

forming a plurality of small-block clusters each including at least a part of regions of the current block, based on an extended block including at least the current block; and calculating a small-block cluster spatial-activity value (i) that is a value indicating complexity of a corresponding one of the small-block clusters, and (ii) that becomes smaller as the corresponding small-block cluster becomes a flatter image, and calculating, as the first spatial-activity value, a lowest value among the calculated small-block cluster spatial-activity values, and wherein the extended block is larger than the current block and less than the size of a whole picture.

10. An integrated circuit which codes an original image, the integrated circuit comprising:

a partition unit configured to partition the original image into a plurality of blocks;

a coding condition determination unit configured to determine a coding condition for a current block that is one of the blocks each having a predetermined size; and a coding unit configured to code the current block according to the coding condition determined by the coding condition determination unit, wherein the coding condition determination unit includes:

a spatial-activity value calculation unit configured to calculate a spatial-activity value that is a value indicating complexity of at least a part of regions of the current block, the spatial-activity value increasing as the complexity increases and becoming smaller as the part of regions of the current block becomes a flatter image;

a comparison unit configured to compare the spatial-activity value calculated by the spatial-activity value calculation unit with a predetermined threshold value; and a determination unit configured to:

determine, as the coding condition for the current block, a first coding condition indicating that the current block is coded in units of a sub-block having a first partitioning size, when the spatial-activity value is smaller than the predetermined threshold value; and determine, as the coding condition for the current block, a second coding condition indicating that the current block is coded in units of a sub-block having a second partitioning size larger than the first partitioning size, when the spatial-activity value is equal to or larger than the predetermined threshold value, wherein spatial-activity value calculation unit is configured to:

form a plurality of small-block clusters each including at least a part of regions of the current block, based on an extended block including at least the current block; and calculate a small-block cluster spatial-activity value (i) that is a value indicating complexity of a corresponding one of the small-block clusters, and (ii) that becomes smaller as the corresponding small-block cluster becomes a flatter image, and calculating, as the first spatial-activity value, a lowest value among the calculated small-block cluster spatial-activity values, and wherein the extended block is larger than the current block and less than the size of a whole picture.

* * * * *